(12) United States Patent
Furtner et al.

(10) Patent No.: US 9,837,915 B2
(45) Date of Patent: Dec. 5, 2017

(54) CONTROLLING COMPONENTS OF POWER CONVERTERS USING DELTA-SIGMA MODULATION ON ANALOG INPUTS

(71) Applicant: Infineon Technologies Austria AG, Villach (AT)

(72) Inventors: Wolfgang Furtner, Fuerstenfeldbruck (DE); Xiaowu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 77 days.

(21) Appl. No.: 14/921,248

(22) Filed: Oct. 23, 2015

(65) Prior Publication Data

US 2017/0117812 A1    Apr. 27, 2017

(51) Int. Cl.
    *H02M 3/335*    (2006.01)

(52) U.S. Cl.
    CPC ... *H02M 3/33515* (2013.01); *H02M 3/33592* (2013.01); *H02M 3/33507* (2013.01); *H02M 3/33523* (2013.01); *H02M 3/33576* (2013.01)

(58) Field of Classification Search
    CPC ......... H02M 3/33507; H02M 3/33515; H02M 3/33523; H02M 3/33576; H02M 3/33592
    See application file for complete search history.

(56) References Cited

U.S. PATENT DOCUMENTS

| 7,447,049 | B2 | 11/2008 | Garner et al. |
| 7,486,528 | B2 | 2/2009 | Yang |
| 7,567,445 | B2 | 7/2009 | Coulson et al. |
| 7,859,862 | B2 | 12/2010 | Lin |
| 8,213,192 | B2 | 7/2012 | Konecny et al. |
| 8,558,728 | B1* | 10/2013 | Lemkin ............ G01R 31/31709 341/155 |
| 2012/0153917 | A1* | 6/2012 | Adell .................. H02M 3/1588 323/283 |
| 2014/0117955 | A1* | 5/2014 | Zoso ..................... H02M 3/157 323/271 |
| 2014/0320100 | A1* | 10/2014 | Congiu ................. H02M 3/157 323/282 |
| 2015/0015308 | A1* | 1/2015 | Da Dalt .................. H03L 7/093 327/106 |

(Continued)

*Primary Examiner* — Jue Zhang
*Assistant Examiner* — Lakaisha Jackson
(74) *Attorney, Agent, or Firm* — Shumaker & Sieffert, P.A.

(57) ABSTRACT

A flyback converter is described that in some examples includes an integrated circuit that includes a delta-sigma converter and a cascaded integrator-comb filter configured to determine: a proportional factor, an integral factor, and a derivative factor associated with a secondary-side voltage across a secondary-side winding of the converter. The integrated circuit uses each factor to control a secondary switching element to perform synchronous rectification. In some examples, the flyback converter includes an auxiliary winding at the primary side of the transformer and a knee point voltage detection unit. The knee point voltage detection unit is configured to determine, based on an analog input indicative of a voltage at the auxiliary winding, an integral of value and detect, based on the integral value, a knee point voltage associated with the voltage at the auxiliary winding. A controller may use the detected knee point to control a primary side switch.

15 Claims, 12 Drawing Sheets

(56) References Cited

U.S. PATENT DOCUMENTS

| | | | | |
|---|---|---|---|---|
| 2015/0222235 A1* | 8/2015 | Swanson | ............... | H02M 3/158 381/120 |
| 2015/0280590 A1* | 10/2015 | Maede | .................. | H02M 3/157 363/21.06 |
| 2016/0020703 A1* | 1/2016 | Gong | ................ | H02M 3/33592 363/21.14 |

* cited by examiner

CONTROLLING COMPONENTS OF POWER CONVERTERS USING DELTA-SIGMA MODULATION ON ANALOG INPUTS

BACKGROUND

Various challenges exist for increasing the durability and/or efficiency of switch-mode power converters. Rather than necessarily use more robust materials and components, a switch-mode power converter may improve performance through more precise control of its switches. A controller of a switch-mode power converter may more precisely control its switches by obtaining more accurate information about the operating state or condition of the components of the power converter. For example, some controllers will rely on very accurate, analog measurements of voltage and current levels at different parts of the system to determine whether to change the operating state of a switch.

Some switch-mode power converters include transformers that provide a galvanic isolation layer between the power source and the load. A controller of such a power converter may further improve its control of its switches by obtaining information about the operating state or condition of the components on both sides galvanic isolation layer. For instance, a controller may better control elements located on the primary-side of the transformer by receiving information about the operating state or condition of the elements located on the secondary-side of the transformer.

SUMMARY

In general, circuits and techniques are described for enabling a power converter to use delta-sigma modulation techniques for internally relaying information throughout the system. Using delta-sigma modulation techniques, a controller may be able to more quickly obtain very accurate information about the operating state or condition of the various components of the power converter, thus enabling the controller to more precisely control the different parts of the system.

In one example, the disclosure is directed to a method that includes receiving, by an integrated circuit, one or more analog inputs indicative of a secondary-side voltage across a secondary-side winding of a transformer of a flyback power converter; converting, by a delta-sigma converter of the integrated circuit, the one or more analog inputs into a digital bit stream indicative of the secondary-side voltage; determining, by a cascaded integrator-comb filter of the integrated circuit, a proportional factor associated with the digital bit stream, an integral factor associated with the digital bit stream, and a derivative factor associated with the digital bit stream; and controlling, by the integrated circuit, a synchronous rectification switching element coupled to the secondary-side winding of the flyback power converter based on the proportional factor, the integral factor, and the derivative factor.

In another example, the disclosure is directed to a flyback converter that includes a transformer having a primary-side winding and a secondary-side winding; a primary switching element configured to couple and de-couple the primary-side winding to and from a voltage source; a secondary switching element coupled to the secondary side winding and configured to perform synchronous rectification when the primary-side winding is de-coupled from the voltage source; and an integrated circuit for controlling the secondary switching element to perform synchronous rectification, wherein the integrated circuit includes: a delta-sigma converter configured to receive one or more analog inputs indicative of a secondary-side voltage across the secondary-side winding and convert the one or more analog inputs into a digital bit stream indicative of the secondary-side voltage; and a cascaded integrator-comb filter configured to determine: a proportional factor associated with the digital bit stream, an integral factor associated with the digital bit stream, and a derivative factor associated with the digital bit stream, wherein the integrated circuit is configured to control the secondary switching element based on the proportional factor, the integral factor, and the derivative factor.

In another example, the disclosure is directed to a method that includes after initially switching-on a primary switching element of a flyback converter to charge a transformer, receiving, by primary-side controller of the flyback converter, an analog input indicative of a voltage at a primary-side auxiliary winding of the transformer; determining, by primary-side controller, based on the analog input, an integral of the voltage at the primary-side auxiliary winding; after switching-off the primary switching element, detecting, by the primary-side controller, based on the integral, a knee point voltage associated with the voltage at the primary-side auxiliary winding; and responsive to detecting the knee point voltage, subsequently switching-on, by the primary-side controller, the primary switching element to charge the transformer.

In another example, the disclosure is directed to a flyback converter a transformer having a primary-side winding, a primary-side auxiliary winding, and a secondary-side winding; a configured to couple and de-couple the primary-side winding to and from a voltage source; a knee point voltage detection unit configured to: determine, based on an analog input indicative of a voltage at the primary-side auxiliary winding, an integral of the voltage at the primary-side auxiliary winding; and detect, based on the integral, a knee point voltage associated with the voltage at the primary-side auxiliary winding; and a controller configured to: after initially switching-on the primary switching element to couple the primary-side winding to the voltage source to charge the transformer, switching-off the primary switching element; and responsive to the knee point voltage detection unit detecting the knee point voltage associated with the voltage at the primary-side auxiliary winding, subsequently switch-on the primary switching element to couple the primary-side winding to the voltage source to charge the transformer.

The details of one or more examples are set forth in the accompanying drawings and the description below. Other features, objects, and advantages of the disclosure will be apparent from the description and drawings, and from the claims.

DETAILED DESCRIPTION

Delta-sigma modulation is a technique used in digital signal processing (DSP) for encoding analog signals into high-resolution digital signals that can then be transferred, decoded, and converted back into analog form. For example, in a conventional analog-to-digital converter (ADC), the ADC integrates or samples an analog signal with a particular sampling frequency and then quantizes the sampled analog signal into digital form.

Delta-sigma modulation performs two steps to reduce error noise in the ADC process. At first, a delta-sigma modulator computes the delta (e.g., difference) between a current sample of an analog signal and a previous sample of the analog signal. Then the delta-sigma modulator integrates the delta and digitizes the integrated delta with an oversampling frequency that is typically much higher than the highest signal frequency into a digital bit steam (e.g., one-bit using a comparator). Next, the delta-sigma modulator converts the digital bit stream back to an analog signal in order to subtract it from the analog input signal. In some examples, the delta-sigma modulation process can be expanded to cover multiple iterations (higher order delta sigma converters) or bits (e.g. converting the delta with four comparators to two bits and the employing a two-bit DAC). The delta-sigma ADC may apply a digital filter to the digital output of the delta-sigma modulator to produce a higher-resolution but lower sample-frequency digital bit stream as its output. The principle of delta-sigma modulation may also be applied to convert the high frequency digital bit stream back into an analog signal.

In general, circuits and techniques are described for enabling a power converter system to use delta-sigma modulation techniques for deriving information about the operating state or condition of one or more components of the power converter system. By using delta-sigma modulation, analog parts of the system may be replaced with digital components so as to enable the system to obtain information about the operating state or condition of the power converter system more quickly, with greater accuracy, and with a higher-resolution, thus enabling a controller to more precisely-control the system. Replacing analog components with digital operations may further reduce the size of the system (e.g., by using less Silicon substrate) and may yield a more robust and flexible implementation that can be changed or modified by changing or modifying the digital logic and control rather than switching-out and replacing analog components with different analog components.

Figure 1:
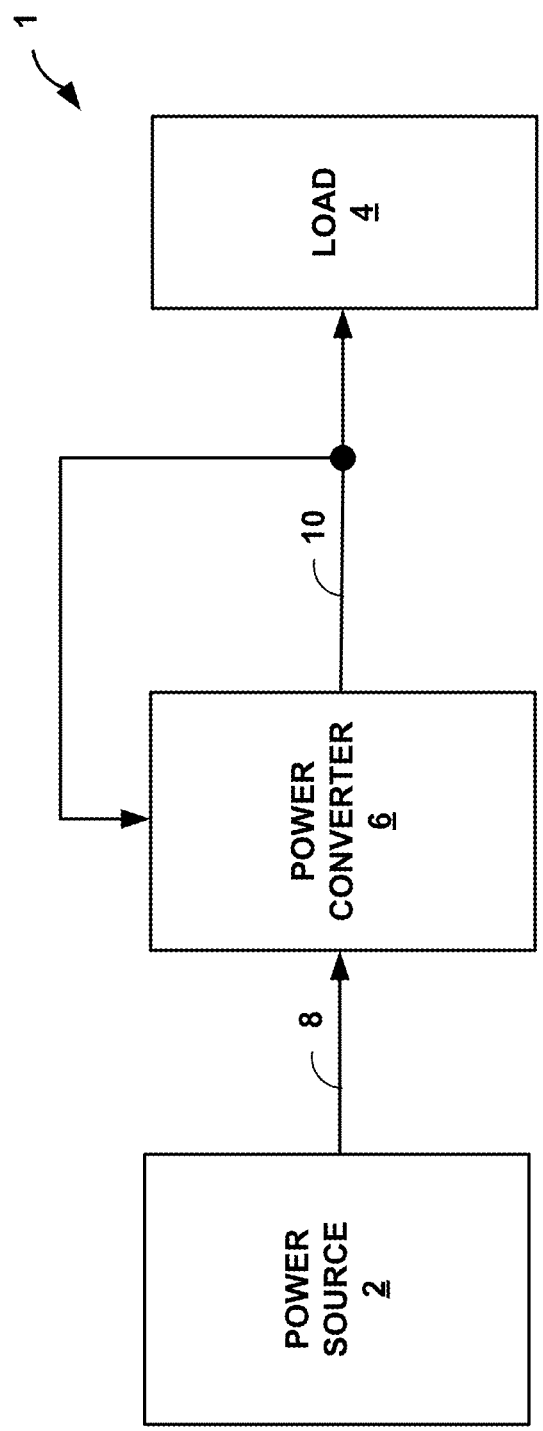
FIG. 1 is a block diagram illustrating an example system for converting power from a power source, in accordance with one or more aspects of the present disclosure.

FIG. 1 is a block diagram illustrating system 1 for converting power from power source 2, in accordance with one or more aspects of the present disclosure. FIG. 1 shows system 1 as having three separate and distinct components shown as power source 2, power converter 6, and load 4, however system 1 may include additional or fewer components. Power source 2, power converter 6, and load 4 may be three individual components or may represent a combination of one or more components that provide the functionality of system 1 as described herein.

System 1 includes power source 2 which provides electrical power to system 1. Numerous examples of power source 2 exist and may include, but are not limited to, power grids, generators, transformers, batteries, solar panels, windmills, regenerative braking systems, hydro-electrical or wind-powered generators, or any other form of devices that are capable of providing electrical power to system 1.

System 1 includes power converter 6 which converts a power input at link 8 (e.g., from source 2) into a power output (e.g., for load 4) at link 10. In some examples, power converter 6 operates as a flyback converter. That is, flyback converter 6 may be a transformer-isolated converter that splits its inductor into one or more transformers to both multiply the voltage ratio between its input and output as well as to galvanically-isolate source 2 from load 4. In other examples, flyback converter 6 may be a LLC converter or other type of power converter.

System 1 further includes load 4. Load 4 receives the electrical power (e.g., voltage and current) converted by power converter 6. In some examples, the power converted by power converter 6 passes through a filter (not shown) before reaching load 4. In some examples, the filter is a sub-component of power converter 6, an external component of power converter 6, and/or a sub-component of load 4. In any event, load 4 (also sometimes referred to herein as device 4) may use the filtered or unfiltered electrical power from power converter 6 to perform a function.

Numerous examples of load 4 exist and may include, but are not limited to, computing devices and related components, such as microprocessors, electrical components, circuits, laptop computers, desktop computers, tablet computers, mobile phones, batteries, speakers, lighting units, automotive/marine/aerospace/train related components, motors, transformers, or any other type of electrical device and/or circuitry that receives a voltage or a current from a power converter.

Power source 2 may provide electrical power with a first voltage and current level over link 8. Load 4 may receive electrical power that has a second voltage and current level, converted by power converter 6, over link 10. Links 8 and 10 represent any medium capable of conducting electrical power from one location to another. Examples of links 8 and 10 include, but are not limited to, physical and/or wireless electrical transmission mediums such as electrical wires, electrical traces, conductive gas tubes, twisted wire pairs, and the like. Each of links 8 and 10 provide electrical coupling between, respectively, power source 2 and power converter 6, and power converter 6 and load 4. In addition, link 10 provides a feedback loop or circuit for carrying information associated with the characteristics of the power output back to power converter 6.

In the example of system 1, electrical power delivered by power source 2 can be converted by converter 6 to power that has a regulated voltage and/or current level that meets the power requirements of load 4. For instance, power source 2 may output, and power converter 6 may receive, power which has a first voltage level at link 8. Power converter 6 may convert the power which has the first voltage level to power which has a second voltage level that is required by load 4. Power converter 6 may output the power that has the second voltage level at link 10.

Load 4 may receive the power that has the second voltage level at link 10. Load 4 may use the power having the second voltage level to perform a function (e.g., power a microprocessor, charge a battery, etc.). Power converter 6 may receive information over link 10 associated with the power that has the second voltage level. For instance, feedback control (e.g., current sensing) circuitry of power converter 6 may detect the voltage or current level of the power output at link 10 and a control unit of converter 6 may adjust the power output at link 10 based on the detected voltage or current level to cause the filtered power output to have a different voltage or current level that fits within a voltage or current level tolerance window required by load 4.

Power converter 6 may include a controller that uses delta-sigma modulation techniques to determine information necessary for controlling the power output at link 10 or other parts of power converter 6. By using delta-sigma modulation, analog parts of system 1 may be replaced with digital components so as to enable system 1 to obtain information about the operating state or condition of system 1 more quickly, with greater accuracy, and with a higher-resolution, thus enabling a controller to more precisely control system 1. Replacing analog components with digital operations may further reduce the size of system 1 (e.g., by using less Silicon substrate) and may yield a more robust and flexible implementation that can be changed or modified by changing or modifying the digital logic and control rather than switching-out and replacing analog components with different analog components.

Figure 2:
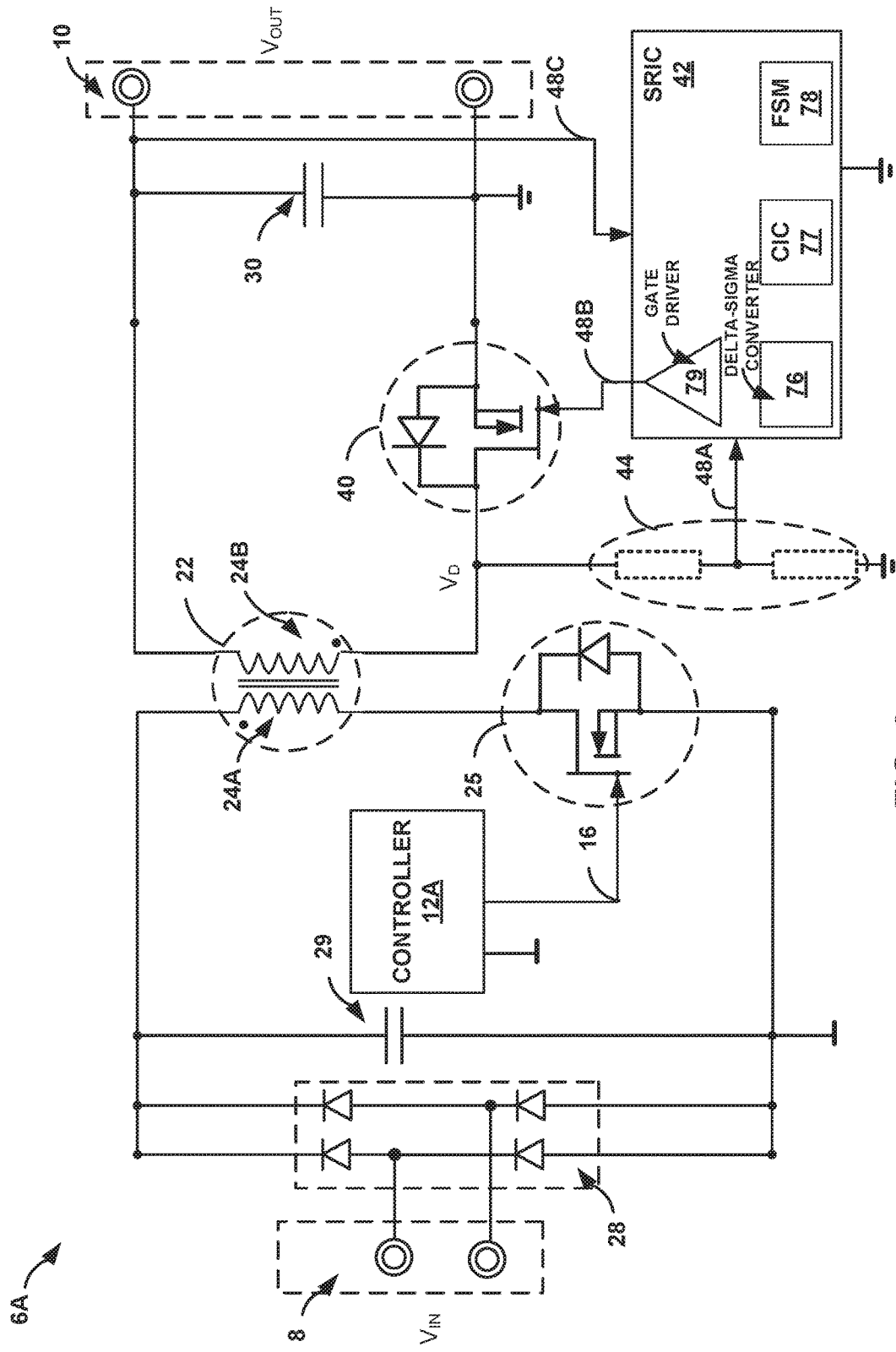
FIG. 2 is a circuit diagram illustrating an example power converter of the example system shown in FIG. 1, which is configured to perform synchronous rectification, in accordance with one or more aspects of the present disclosure.

FIG. 2 is a circuit diagram illustrating power converter 6A as an example power converter of the example system shown in FIG. 1, which is configured to perform synchronous rectification, in accordance with one or more aspects of the present disclosure. Power converter 6A is a flyback converter and includes transformer 22. Transformer 22 provides isolation between a primary-side of power converter 6A and a secondary-side of power converter 6A.

Controller 12A is shown as a primary controller that is positioned on the primary-side of power converter 6A. In other examples, controller 12A may be a secondary controller that is located on the secondary-side of power converter 6A. In addition to controller 12A, the primary-side of power converter 6A includes rectifier 28, input capacitor 29, and primary switching element 25 arranged in series between rectifier 28 and primary winding 24A of transformer 22. In the example of FIG. 2, primary switching element 25 is a power MOSFET and includes a body diode.

The secondary-side of power converter 6A includes output capacitor 30 in parallel to load 4 and secondary switching element 40 (e.g., a power MOSFET that includes a body diode) arranged in series between secondary winding 24B and output capacitor 30/load 4. The secondary-side of converter 6A also includes (optional) voltage divider 44 and synchronous rectification (SR) integrated circuit (IC) 42 (referred to simply as "SRIC 42").

Controller 12A may be a processor, an application-specific-integrated-circuit (ASIC), a microcontroller, a field-programmable-gate-array (FPGA), or any other type of processing device or processing unit configured to perform operations described herein. In some examples, controller 12A includes a memory, such as a non-transitory computer-readable storage medium and executes instructions stored thereon to perform operations described herein.

In operation, controller 12A may provide a gate control signal via link 16 to primary switching element 25 that causes the MOSFET of element 25 to switch-on or switch-off. Controller 12A may generate a gate signal across link 16 that causes the MOSFET of element 25 to switch-on and as a result, causes a current to travel from source 2, via link 8, through primary winding 24A. Controller 12A may generate a different gate signal that causes the MOSFET of element 25 to switch-off and, as a result, inhibits current from traveling from source 2, via link 8, through primary winding 24A. Controller 12A may modulate the gate control signal to primary switching element 25. In this way, controller 12A may cause converter 6A to vary the output voltage $V_{OUT}$ that converter 6A outputs across link 10.

During a switching cycle, when the body diode of secondary switching element 40 becomes reverse-biased, the load current ($I_{OUT}$) is supplied from output capacitor 30. Output capacitor 30 typically has a capacitance that is large enough to supply the required amount of load current $I_{OUT}$ for the time period $T_{ON}$, while also satisfying the maximum specified droop in the output voltage $V_{OUT}$.

SRIC 42 is configured to control secondary switching element 40 to perform synchronous rectification on behalf of converter 6A. In some examples, SRIC 42 may be a processor, an application-specific-integrated-circuit (ASIC), a microcontroller, a field-programmable-gate-array (FPGA), or any other type of processing device or processing unit configured to perform operations described herein. In some examples, SRIC 42 includes a memory, such as a non-transitory computer-readable storage medium and executes instructions stored thereon to perform operations described herein. In some examples, SRIC 42 includes software, hardware, firmware, or a combination thereof to perform the operations described herein.

SRIC 42 may send gate control signals via link 48B to cause the MOSFET of secondary switching element 40 to switch-on or switch-off depending on the voltages detected by SRIC 42 at links 48A and 48C. SRIC 42 may perform synchronous rectification techniques without the need to withstand very high voltages (e.g., >200V) or the requirement to detect very low negative voltages (e.g., approximately −10 mV). In addition, the accuracy of SRIC 42 (e.g., how closely SRIC 42 can cause secondary switching element 40 to switch-on and switch-off in-synch with the switch-on and switch-off of primary element 25) may be very high since, unlike some other types of synchronous rectification integrated circuits, the accuracy of SRIC 42 may not depend on the input voltage, the output voltage, and/or the working frequency.

SRIC 42 includes a combination of delta-sigma converter 76, Cascaded Integrator-Comb (CIC) filter 77, finite-state-machine (FSM) 78 for digitally deriving the gate signal that SRIC 42 outputs at link 48B for controlling when secondary switching element 40 switches-on and switches-off, and gate driver 79 for driving the gate of secondary switching element 40 to either a switched-on or switched-off state. SRIC 42 causes secondary switching element 40 to switch-on and switch-off "in-synch" with the switch-on and switch-off of primary switching element 25 (e.g., while primary controller 12A modulates primary switching element 25 to produce a voltage output at link 10).

Delta-sigma converter 76 may determine, based on analog inputs received via links 48A and 48C, an analog signal indicative of the secondary-side voltage $V_S$ level across secondary-side winding 24B and using delta-sigma modulation, rapidly convert the analog $V_S$ signal into a one-bit data stream for CIC filter 77. CIC filter 77 may extract proportional, integral, and derivative (PID) terms or factors from the one-bit data stream.

Consider CIC filter 77 may normally be used to convert the high frequency digital bit stream into a lower frequency multi bit result. CIC filter 77 may convert the digital bit stream by subsequent accumulation or integration of the digital stream, followed by a sub-sampling, and followed further by subtraction of subsequent samples or differentiation. The quantity of subsequent integrations and differentiations represents "the order" of the CIC filter 77. In other words, a second order CIC filter has two integrations and two differentiations. In some power control applications, a controller may benefit from determining the integral of a signal (e.g. to detect energy flow) or the differential of a signal (e.g. to detect slopes). A CIC filter naturally contains a digital representation of a signal, the integrated signal, and the differentiated signal. In some examples, higher order integrals and differentials can be derived and used as inputs to controller 12B. As used herein, the proportional term (P) associated with a digital signal, the integral term (I) associated with a digital signal, and the differential term (D) associated with a digital signal are the natural PID outputs extracted from a digital signal by a CIC filter.

FSM 78 may use the PID terms extracted by CIC filter 77 to determine a gate control signal that SRIC 42 outputs to at link 48B to switch-on or switch-off secondary switching element 40. For example, when the proportional (P) factor and derivative (D) factors are low while secondary switching element 40 is switched-off, FSM 78 may determine that the secondary switching element 40 should remain switched-off and wait for primary switching element 25 to switch-on. When the P factor and D factors are high, and also when the integral (I) factor is at a maximum or a falling edge trigger, FSM 78 may determine that the secondary switching element 40 should switch-on. And lastly when the I factor is at or near a zero value while secondary switching element 40 is switched-on, FSM 78 may determine that secondary switching element 40 should switch-off. SRIC 42 may output a gate control signal via gate driver 79 for controlling secondary switching element 40 that reflects the determination made by FSM 78 as to whether secondary switching element 40 should be switched-on or switched-off.

In some examples, FSM 78 may be a processor, an application-specific-integrated-circuit (ASIC), a microcontroller, a field-programmable-gate-array (FPGA), or any other type of processing device or processing unit configured to perform operations described herein. In some examples, FSM 78 includes a memory, such as a non-transitory computer-readable storage medium and executes instructions stored thereon to perform operations described herein. In some examples, FSM 78 includes software, hardware, firmware, or a combination thereof to perform the operations described herein.

Figure 3:
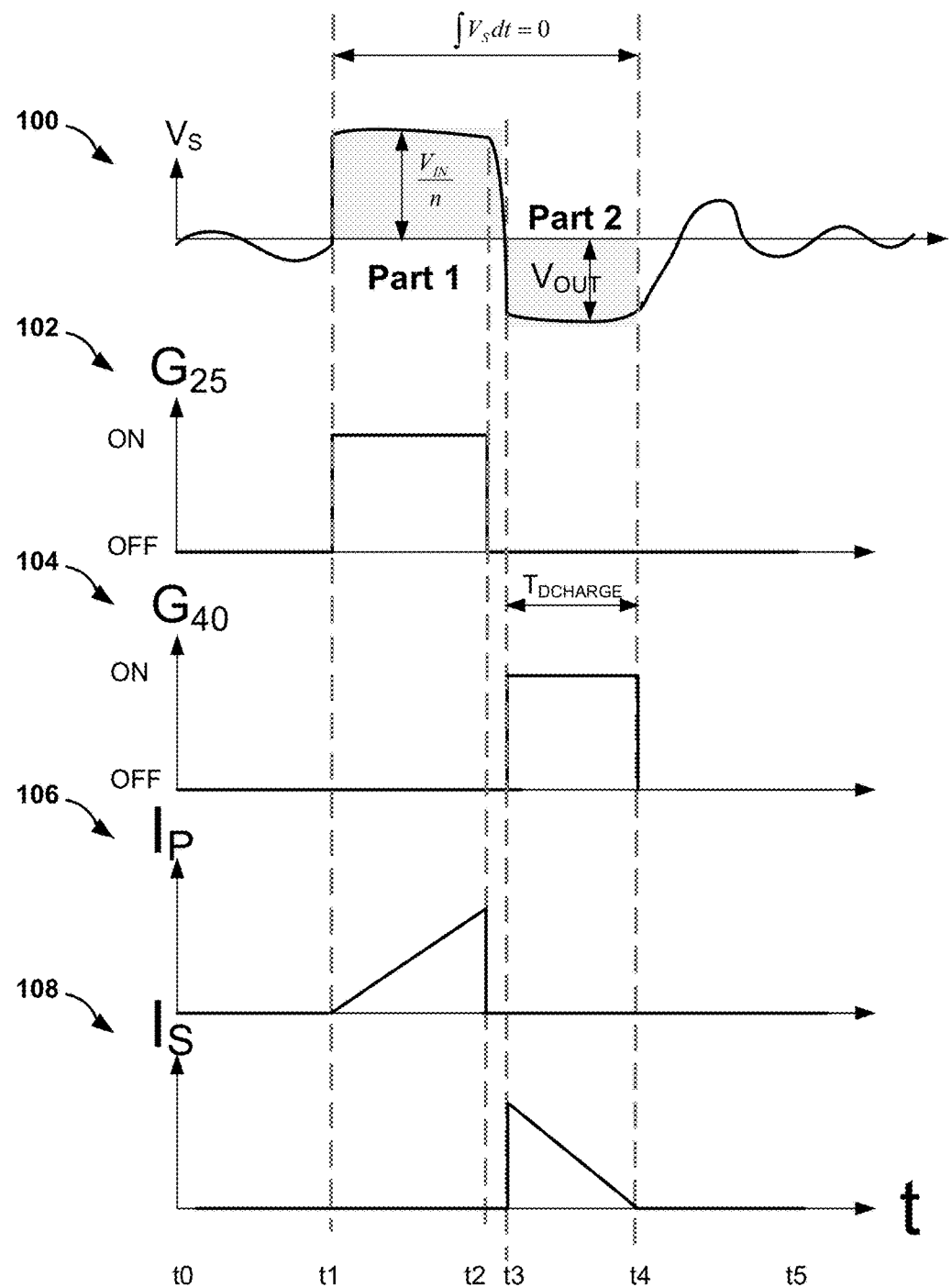
FIG. 3 is a timing diagram illustrating various electrical characteristics of the example power converter shown in FIG. 2, in accordance with one or more aspects of the present disclosure.

FIG. 3 is a timing diagram illustrating various electrical characteristics of power converter 6A, in accordance with one or more aspects of the present disclosure. FIG. 3 is described below in the context of converter 6A of FIG. 2. In particular, waveforms 100-108 of FIG. 3 represent the typical wave forms of a discontinuous-mode (DCM) flyback topology.

Waveform 100 corresponds to the secondary-side voltage $V_S$ at secondary-side winding 24B between times t0 and t5. Waveforms 102 and 104 correspond, respectively, to the gate control signal $G_{25}$ applied to primary switching element 25 and the gate control signal $G_{40}$ applied to secondary switching element 40 between times t0 and t5. And waveforms 106 and 108 correspond, respectively, to the primary-side current $I_P$ running through primary-side winding 24A and the secondary-side current $I_S$ running through secondary-side winding 24B between times t0 and t5.

While operating power converter 6A in DCM, at time t1, controller 12A may generate gate control signal $G_{25}$ at link 16 so as to cause primary switching element 25 to switch-on (e.g., to increase the energy at transformer 22 and regulate the output voltage at link 10). At time t2, controller 12A may generate gate control signal $G_{25}$ at link 16 so as to cause primary switching element 25 to switch-off (e.g., after the energy at transformer 22 has sufficiently been increased). At time t3, shortly after primary switching element 25 switches off, SRIC 42 may perform synchronous rectification by generating a gate control signal $G_{40}$ at link 48B to cause secondary switching element 40 to switch-on until time t4 (e.g., before primary switching element 25 switches-on) at which time SRIC 42 adjusts the gate control signal $G_{40}$ at link 48B to cause secondary switching element 40 to switch-off.

Since SRIC 42 is galvanically-isolated from primary switching element 25 and controller 12A, SRIC 42 determines on its own when to switch-on and switch-off secondary switching element 40 in order to perform synchronous rectification. SRIC 42 controls secondary switching element 40 for performing synchronous rectification by predicting, based on the voltage $V_S$ across secondary-side winding 24B, when primary switching element 25 has switched-off.

For example, consider the following derivations shown in EQS. 1-5. EQ. 1 shows that in DCM operation, when primary switching element 25 is switched-off for the amount of time $T_{OFF}$, the maximum or "peak" level of current of secondary-side winding 24B ($I_{SP}$) is achieved. In EQ. 1, ($Ip_{PP}$) is the peak current of primary-side winding 24A, ($N_P$) represents the number of turns associated with primary-side winding 24A, and ($N_S$) is the number of turns at secondary-side winding 24B.

$$I_{SP} = \frac{N_P}{N_S} \times I_{PP} \qquad \text{EQ. 1}$$

When primary switching element 25 is switched-on for the amount of time ($T_{ON}$), the maximum or "peak" level of current of primary-side winding 24A ($I_{PP}$), given by EQ. 2, is achieved. In EQ. 2, ($L_P$) is the inductance of primary-side winding 24A and ($V_{IN}$) is the primary-side input voltage from source 2.

$$I_{PP} = \frac{V_{IN}}{L_P} \times T_{ON} \qquad \text{EQ. 2}$$

EQ. 3 also shows that the peak level of current of secondary-side winding 24B ($I_{SP}$) is proportionate to a ratio between the output voltage ($V_{OUT}$) across output capacitor 30 combined with the voltage $V_D$ at the drain terminal of the transistor associated with secondary switching element 40 at link 48A, and the inductance of secondary-side winding 24B ($L_S$), multiplied by the amount of time that secondary-side winding 24B takes to demagnetize ($T_{DCHARGE}$) and also corresponds to the amount of time to delay, after primary switching element 25 switched-off, before secondary switching element 40 can switch-on.

$$I_{SP} = \frac{(V_{OUT} + V_D)}{L_S} \times T_{DCHARGE} \qquad \text{EQ. 3}$$

Accordingly, by substituting the terms of EQ. 1 with respective, equivalent terms of EQ. 2 and EQ. 3 the on-time of secondary switching element 40 ($T_{DCHARGE}$) can be computed per EQ. 4. In other words, the term ($T_{DCHARGE}$) of EQ. 4 represents the amount of time that SRIC 42 must wait, after controller 12A switches off primary switching element 25, before switching off secondary switching element 40 to perform synchronous rectification.

$$\frac{V_{IN} \times T_{ON}}{N_P} = \frac{(V_{OUT} + V_D)}{N_S} \times T_{DCHARGE} \qquad \text{EQ. 4}$$

It turns out that the left side term of EQ. 4 is the integral of the secondary-side voltage $V_S$ of waveform 100 between times t1 and t2 (i.e., the area of "Part 1" shown in FIG. 3) and the right side term of EQ. 4 is the integral of the secondary-side voltage $V_S$ of waveform 100 between times t3 and t4 (i.e., the area of "Part 2" shown in FIG. 3). Therefore, SRIC 42 may determine the on-time of secondary switching element 40 ($T_{DCHARGE}$) by measuring the secondary-side voltage $V_S$ and computing an integral value of the secondary-side voltage $V_S$.

For example, based on analog voltage measurements of $V_D$ and $V_{OUT}$ obtained, respectively, via links 48A and 48C, SRIC 42 may measure the secondary-side voltage $V_S$. SRIC 42 can sense the voltage level $V_S$ at secondary-side winding 24B by computing the difference between the voltage $V_D$ at links 48A and the voltage $V_{OUT}$ at link 48C (e.g., see EQ. 5).

$$V_S = V_D - V_{OUT} \qquad \text{EQ. 5}$$

At time t0, before controller 12A switches-on primary switching element 25, SRIC 42 may determine that the secondary-side voltage $V_S$ is approximately zero and reset its integration calculation. At time t1, after controller 12A switches-on primary switching element 25, SRIC 42 may determine that the secondary-side voltage $V_S$ exceeds a threshold (e.g., greater than zero volts) and begin integrating the secondary-side voltage $V_S$ to determine $T_{DCHARGE}$.

At time t2, just after controller 12A switches-off primary switching element 25, the secondary-side voltage $V_S$ will be at a maximum threshold (e.g., a "peak" value) after which, the secondary-side voltage $V_S$ will decrease to a zero value at time t3. At time t3, responsive to determining that the secondary-side voltage $V_S$ is at a zero value, SRIC 42 may determine that the current time corresponds to the on-time of secondary switching element 40 ($T_{DCHARGE}$) and cause secondary-switching element 40 to switch-on. At time t4, responsive to determining that the secondary-side voltage $V_S$ going back to a zero value, SRIC 42 may cause secondary-switching element 40 to switch-off.

Figure 4A:
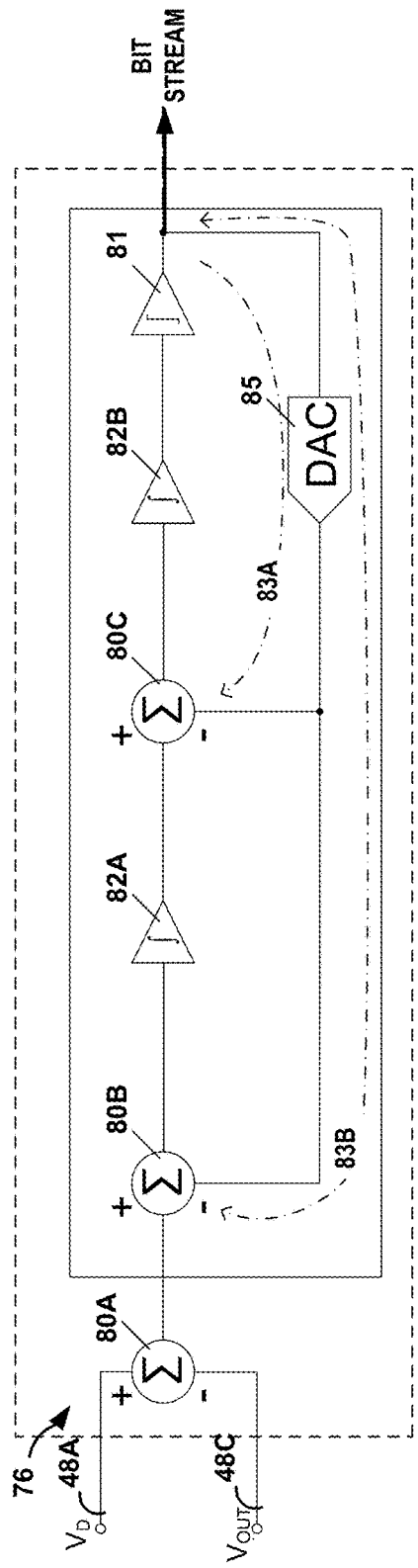
FIGS. 4A-4C are conceptual diagrams illustrating detailed views of various components of an example synchronous rectification integrated circuit of the example power converter of FIG. 2.
Figure 4B:
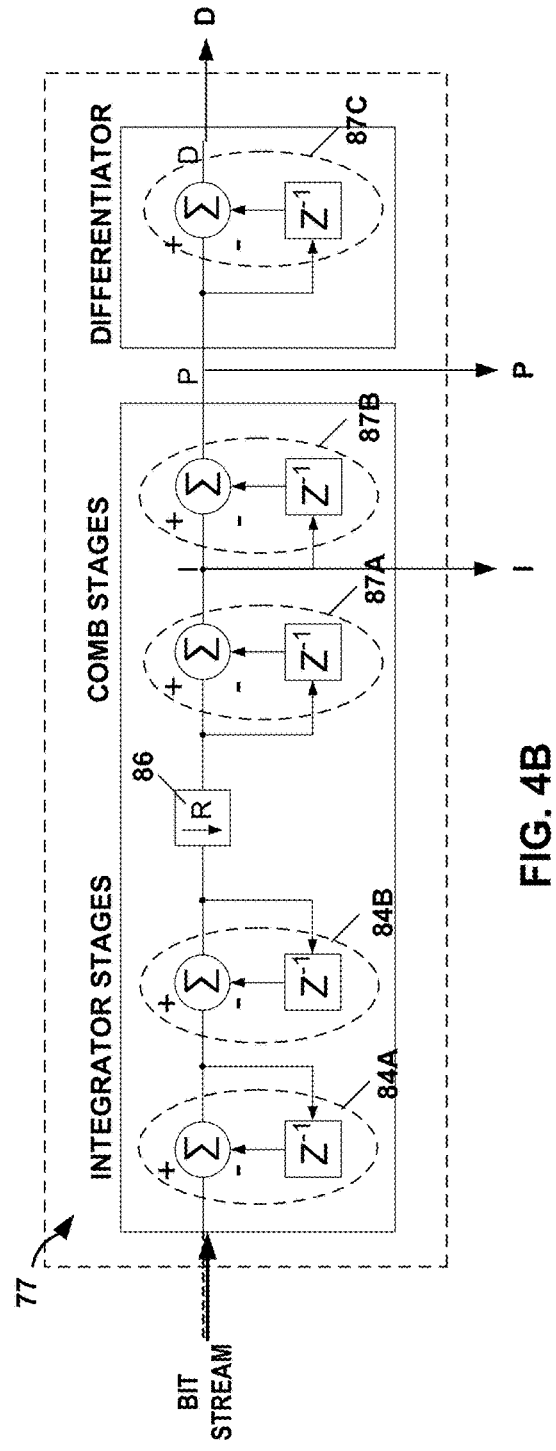
Figure 4C:
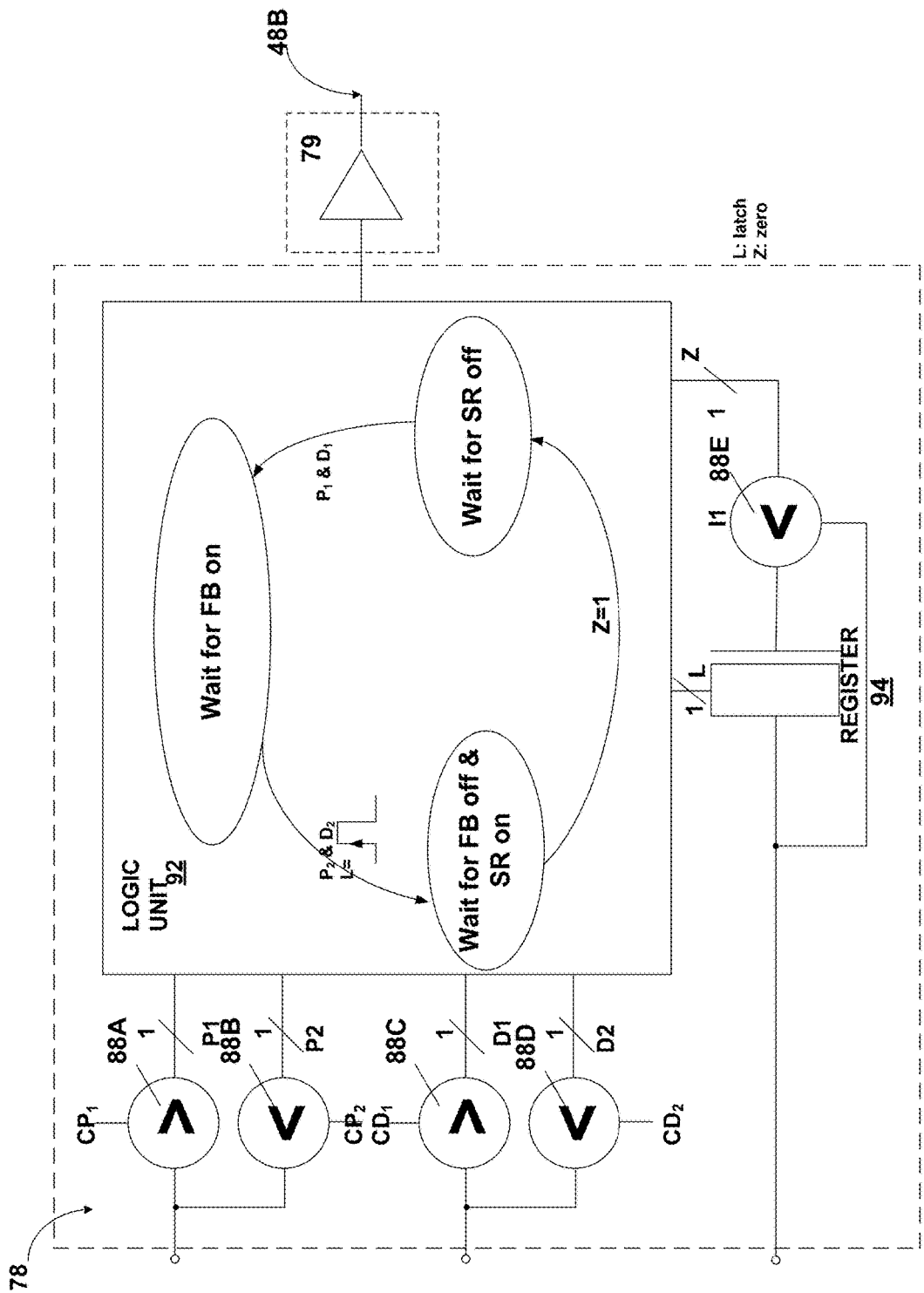

FIGS. 4A-4C are conceptual diagrams illustrating detailed views of various components of SRIC 42 of power converter 6A of FIG. 2. FIGS. 4A-4C are described below in the context of FIGS. 1-3.

FIG. 4A shows an example of delta-sigma converter 76. In the example of FIG. 4A, delta-sigma converter 76 is a second-order delta-sigma converter. In other examples, delta-sigma converter 76 may be an $n^{th}$ order delta-sigma converter. Delta-sigma converter 76 receives the analog voltage inputs $V_D$ and $V_{OUT}$ and through second-order delta-sigma conversion techniques, produces a high-frequency one-bit data stream output. Delta-sigma converter 76 includes a group of adders 80A-80C interspersed with, and connected in series with, a group of integrators 82A and 82B and coupled to the input of a one-bit ADC (e.g., comparator) 81. Delta-sigma converter 76 also include DAC 85 which forms feedback loops 83A and 83B that couple the output of delta-sigma converter 76 (i.e., the output of ADC 81) to, respectively, a respective input of adders 80C and 80B.

FIG. 4B shows an example of CIC filter 77. In the example of FIG. 4B, CIC filter 77 is a second-order CIC filter. In other examples, CIC filter 77 may be an $n^{th}$ order CIC filter. CIC filter 77 includes a cascade of digital integrators 84A and 84B followed by a cascade of combs 87A and 87B (i.e., digital differentiators) in equal quantity to the quantity of digital integrators 84A and 84B. Between digital integrators 84A and 84B and digital differentiators 87A and 87B is digital switch or decimator 86 (e.g., used to lower the sampling frequency of the combs signal with respect to the sampling frequency of the integrators). An additional differentiator 87C follows the cascade of combs 87A and 87B. CIC filter 77 receives the one-bit digital stream from delta-sigma converter 76 and outputs the P, I, and D terms that are used by FSM 78.

FIG. 4C shows an example of FSM 78 and gate driver 79. In the example of FIG. 4C, FSM 78 receives the P, I, and D terms from CIC filter 77 to determine when to cause gate driver 79 to output a gate signal at link 48B that causes secondary switching element 40 to either switch-on or switch-off. FSM 78 includes comparators 88A-88D, logic unit 92, and register 94.

Logic unit 92 of FSM 78 may cause gate driver 79 to output a gate signal at link 48B that maintains secondary switching element 40 in a switched-off state when the proportional P and derivative D inputs are both high (e.g., when the P and D inputs exceed, respectively, thresholds $CP_1$ and $CD_1$). Conversely, when the proportional P and derivative inputs D are both low (e.g., when the P and D inputs do not exceed, respectively, thresholds $CP_2$ and $CD_2$), logic unit 92 of FSM 78 may cause gate driver 79 to output a gate signal at link 48B that causes secondary switching element 40 to switch-on. When the integral I input is almost at but still greater than zero (e.g., approaching but greater than threshold I1), logic unit 92 of FSM 78 may cause gate driver 79 to output a gate signal at link 48B that causes secondary switching element 40 to switch-off. In some examples, thresholds $CP_1$, $CP_2$, $CD_1$, $CD_2$ and I1 are configurable parameters or thresholds than can be tuned during manufacturing and/or when power converter 6A is operational (e.g., during test or in the field).

Figure 5:
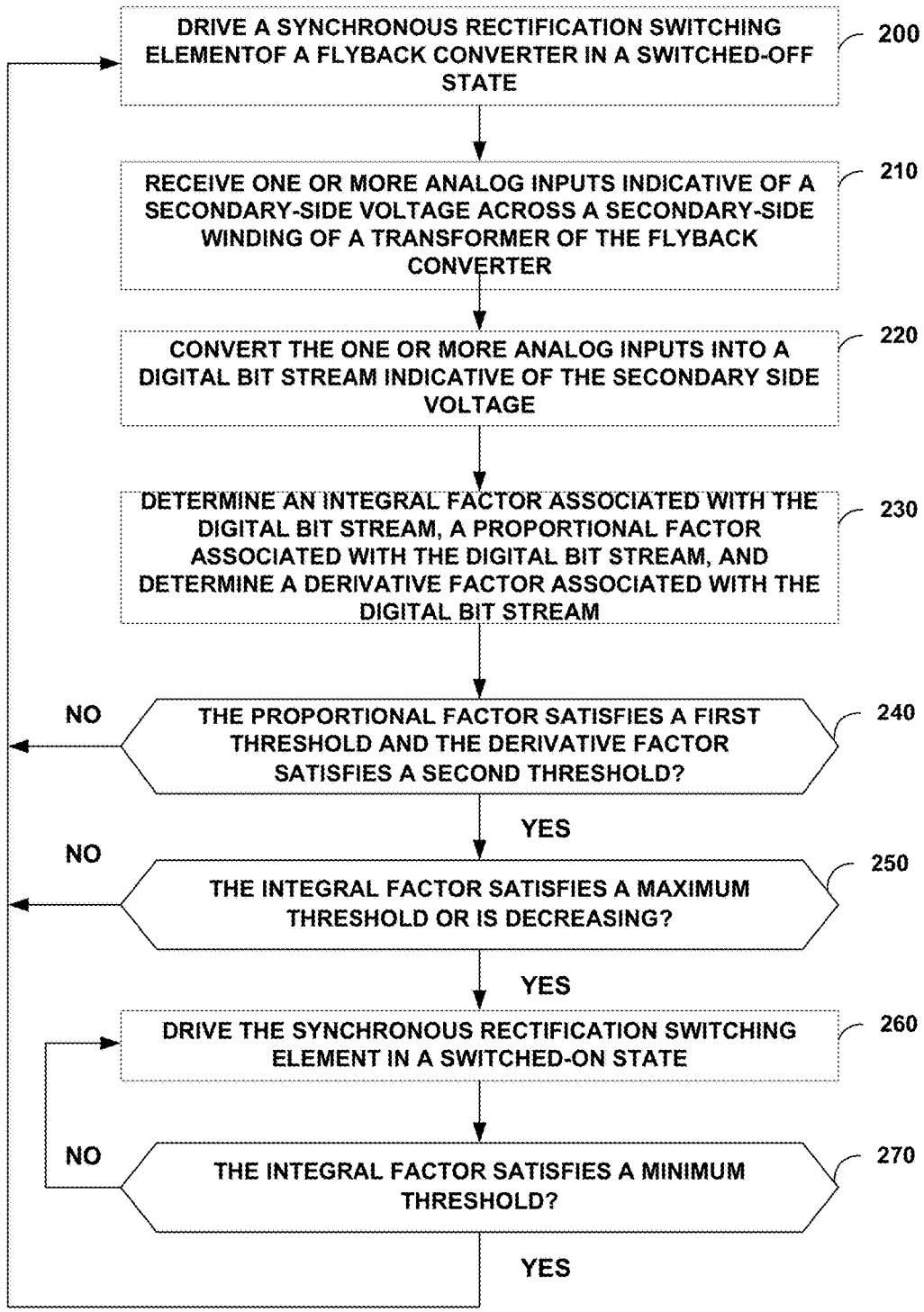
FIG. 5 is a flowchart illustrating example operations performed by the example power converter of FIG. 2, in accordance with one or more aspects of the present disclosure.

FIG. 5 is a flowchart illustrating operations 200-270 performed by power converter 6A of FIG. 2, in accordance with one or more aspects of the present disclosure. FIG. 5 is described below in the context of FIGS. 1-4. For example, a processor of SRIC 42 of power converter 6A of FIG. 2 may be configured to perform operations 200-270. In some examples, operations 200-270 of FIG. 5 may be repeated for every switching pulse of primary switching element 25.

In the example of FIG. 5, SRIC 42 of converter 6A may drive a synchronous rectification switching element in a switched-off state (200). For example, at initial power up or on reset, as controller 12A drives primary switching element 25 in a switched-on state to increase the energy at transformer 22, SRIC 42 may output a gate signal via driver 79 that causes secondary switching element 40 to operate in a switched-off state.

SRIC 42 may receive one or more analog inputs indicative of a secondary-side voltage across a secondary-side winding of a transformer of a flyback power converter (210). For example, to determine whether to cause secondary switching element 40 to operate in a switched-on or switched-off state, SRIC 42 may receive analog signals indicative of the drain-voltage at a transistor of secondary switching element 40 and the output voltage across output capacitor 30. SRIC 42 may discern a differential between the two analog signals and input the differential as an input into delta-sigma converter 76.

SRIC 42 may convert the one or more analog inputs into a digital bit stream (e.g., a one-bit digital bit stream, two-bit digital bit stream, or n-bit digital bit stream) indicative of the secondary-side voltage. For example, using delta-sigma conversion techniques, delta-sigma converter 76 may produce a one-bit digital output based on the differential output discerned from the analog inputs.

SRIC 42 may determine a proportional factor associated with the digital bit stream, an integral factor associated with the digital bit stream, and a derivative factor associated with the digital bit stream (230). For example, using CIC filter 77, SRIC 42 may produce three separate control signals based on the one-bit digital output from delta-sigma converter 76. For instance, consider FIGS. 4A and 4B. The integral factor may correspond to an output of a differentiator 87A of the comb stage of CIC filer 77 and an input of differentiator 87B of the comb stage of CIC filter 77. The proportional factor may correspond to an output of the comb stage of CIC filter 77 and an input of the single differentiator of CIC filter 77. And the derivative factor may correspond to an output of the single differentiator of CIC filter 77.

SRIC 42 may control the synchronous rectification switching element coupled to the secondary-side winding of the flyback power converter based on the proportional factor, the integral factor, and the derivative factor. For instance, FSM 78 of SRIC 42 may use each of the integral factor, the derivative factor, and the proportional factor, to produce a control signal that causes driver 79 to drive secondary switching element 40 to switch-on or to switch-off. FSM 78 may use various (programmable and non-programmable) thresholds to affect the timing and accuracy associated with when secondary switching element 40 switches-on or switches-off.

In the example of FIG. 5, to control secondary switching element 40, SRIC 42 may determine whether the proportional factor satisfies a first threshold and whether the derivative factor satisfies a second threshold (240). For example, SRIC 42 may determine that if the proportional factor and the derivative factor are low, that controller 12A has yet to switch on primary switching element 25. SRIC 42 may maintain secondary switching element 40 in a switched-off state while primary switching element 25 initially remains switched-off.

Conversely, if SRIC 42 determines that the proportional factor and the derivative factor are both high, that controller 12A has yet to switch on primary switching element 25. In this case, SRIC 42 may determine whether the integral factor satisfies a maximum threshold or if the integral factor is decreasing (250). For example, even if SRIC 42 determines that the proportional factor and the derivative factor are both high, SRIC 42 will only switch-on secondary switching element 40 if SRIC 42 determines that controller 12A has again switched-off primary switching element 25. SRIC 42 may determine that when the integral factor is at its maximum or is decreasing (i.e., not increasing) that controller 12A has likely switched primary switching element 25 back-off and that it is safe to switch-on secondary switching element 40 to perform synchronous rectification.

SRIC 42 may drive the synchronous rectification switching element in a switched-on state (260). For example, after determining that the integral factor has surpassed its maximum and/or is decreasing, FSM 78 may cause driver 79 to produce a control signal that causes secondary switching element 40 to switch-on.

After driving the synchronous rectification switching element in the switched-on state and responsive to determining that the integral factor satisfies a minimum threshold (270), SRIC 42 may drive the synchronous rectification switching element in a switched-off state (200). For example, FSM 78 of SRIC 42 may continuously monitor the integral factor to determine when to end the current synchronous-rectification switching cycle associated with secondary switching element 40. FSM 78 may analyze the integral factor and in response to determining that the integral factor is nearing zero, determine that controller 12A may soon switch-on primary switching element 25 and as a result, determine that secondary switching element 40 should switch back-off. FSM 78 may cause driver 79 to produce a control signal that causes secondary switching element 40 to switch-off.

By performing operations described herein, such as operations 200-270, a synchronous rectification integrated circuit configured to control a synchronous rectification switching element of a flyback converter can do so with high performance and with very high accuracy without having to include expensive or additional features to handle or process high voltages and/or perform high accuracy comparisons.

Figure 6:
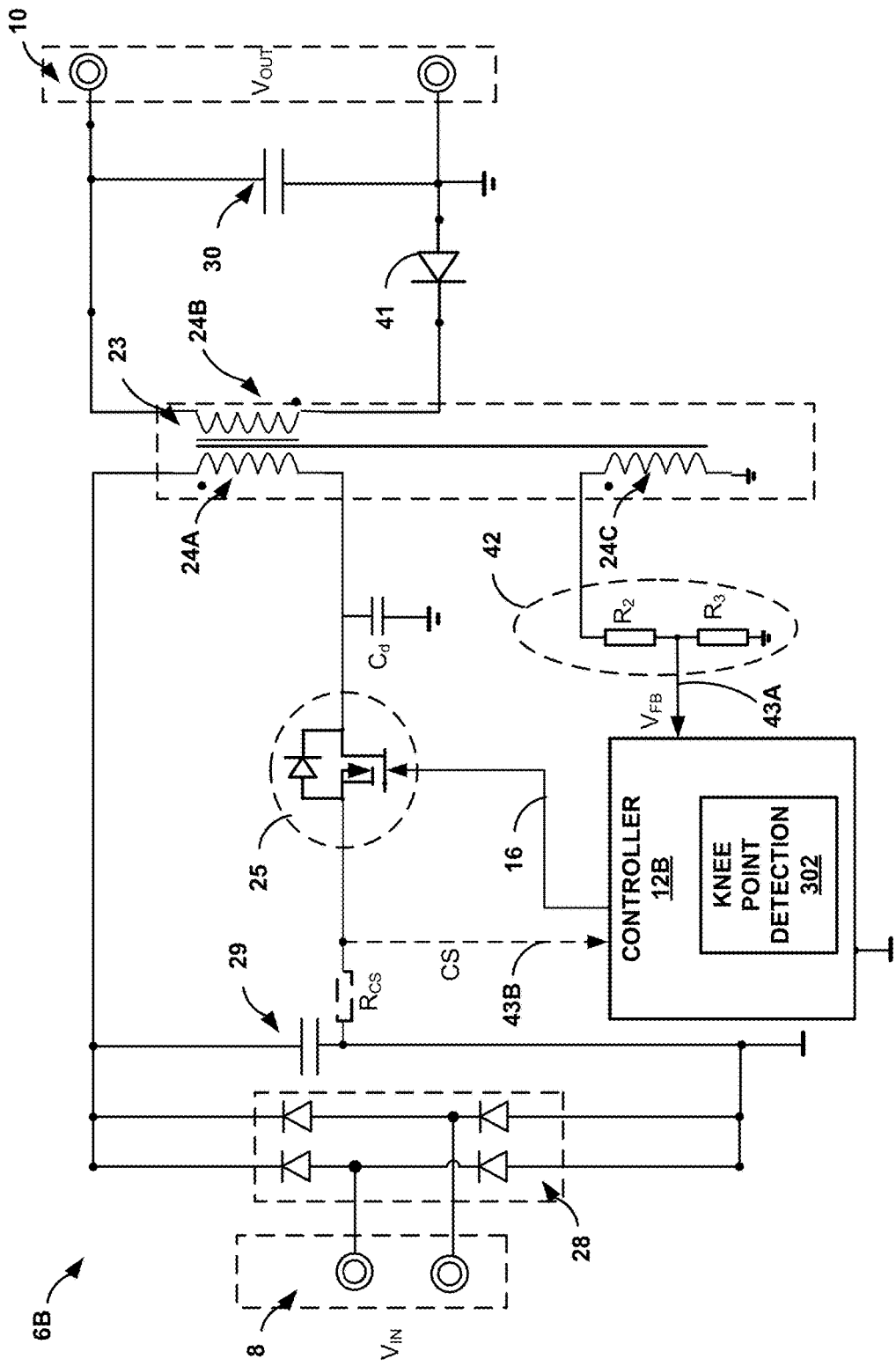
FIG. 6 is a circuit diagram illustrating an example power converter of the example system shown in FIG. 1, which is configured to perform flyback control, in accordance with one or more aspects of the present disclosure.

FIG. 6 is a circuit diagram illustrating power converter 6B as an example of power converter 6 of system 1 shown in FIG. 1, which is configured to perform flyback control, in accordance with one or more aspects of the present disclosure. Power converter 6B is a flyback converter and includes transformer 23. Transformer 23 is similar to transformer 22 of converter 6A, in that transformer 23 provides isolation between a primary-side of power converter 6B and a secondary-side of power converter 6B. However, in addition to primary-side winding 24A and secondary-side winding 24B, transformer 23 also includes auxiliary winding 24C on the primary side of transformer 23.

Converter 6B includes controller 12B positioned on the primary-side of power converter 6B. In addition to controller 12B, the primary-side of power converter 6B includes rectifier 28, input capacitor 29, and primary switching element 25. In the example of FIG. 6, is a power MOSFET and includes a body diode. The primary-side of power converter 6B further includes voltage divider 42 coupled to auxiliary winding 24C of transformer 23. Controller 12B receives as input, the resistor divided voltage $V_{FB}$ of auxiliary winding 24C and the common source voltage $V_{CS}$ associated with primary switching element 25 at link 43B. Controller 12B outputs a gate control signal via link 16 for causing primary switching element 25 to switch-on or switch-off. In some examples, controller 12B may receive additional or fewer inputs than those shown in FIG. 6. In some examples, controller 12B may provide additional or fewer outputs than those shown in FIG. 6.

The secondary-side of power converter 6B includes output capacitor 30 in parallel to load 4 and secondary element 41 (e.g., a diode) arranged in series between secondary winding 24B and output capacitor 30/load 4. Although shown as a diode, secondary element 41 may in some examples be a synchronous rectification switching element, such as secondary switching element 40 from FIG. 2.

Controller 12B may be a processor, an application-specific-integrated-circuit (ASIC), a microcontroller, a field-programmable-gate-array (FPGA), or any other type of processing device or processing unit configured to perform operations described herein. In some examples, controller 12B includes a memory, such as a non-transitory computer-readable storage medium and executes instructions stored thereon to perform operations described herein.

In operation, controller 12B may provide a gate control signal via link 16 to primary switching element 25 that causes the MOSFET of element 25 to switch-on or switch-off. In the example of FIG. 6, controller 12B includes knee point detection unit 302. As is described below with respect to FIGS. 7-11, controller 12B may use knee point detection unit 302 to determine the knee point voltage $V_{KNEE}$ associated with the resistor divided voltage $V_{FB}$ of auxiliary winding 24C to determine when to switch-on primary switching element 25.

Figure 7:
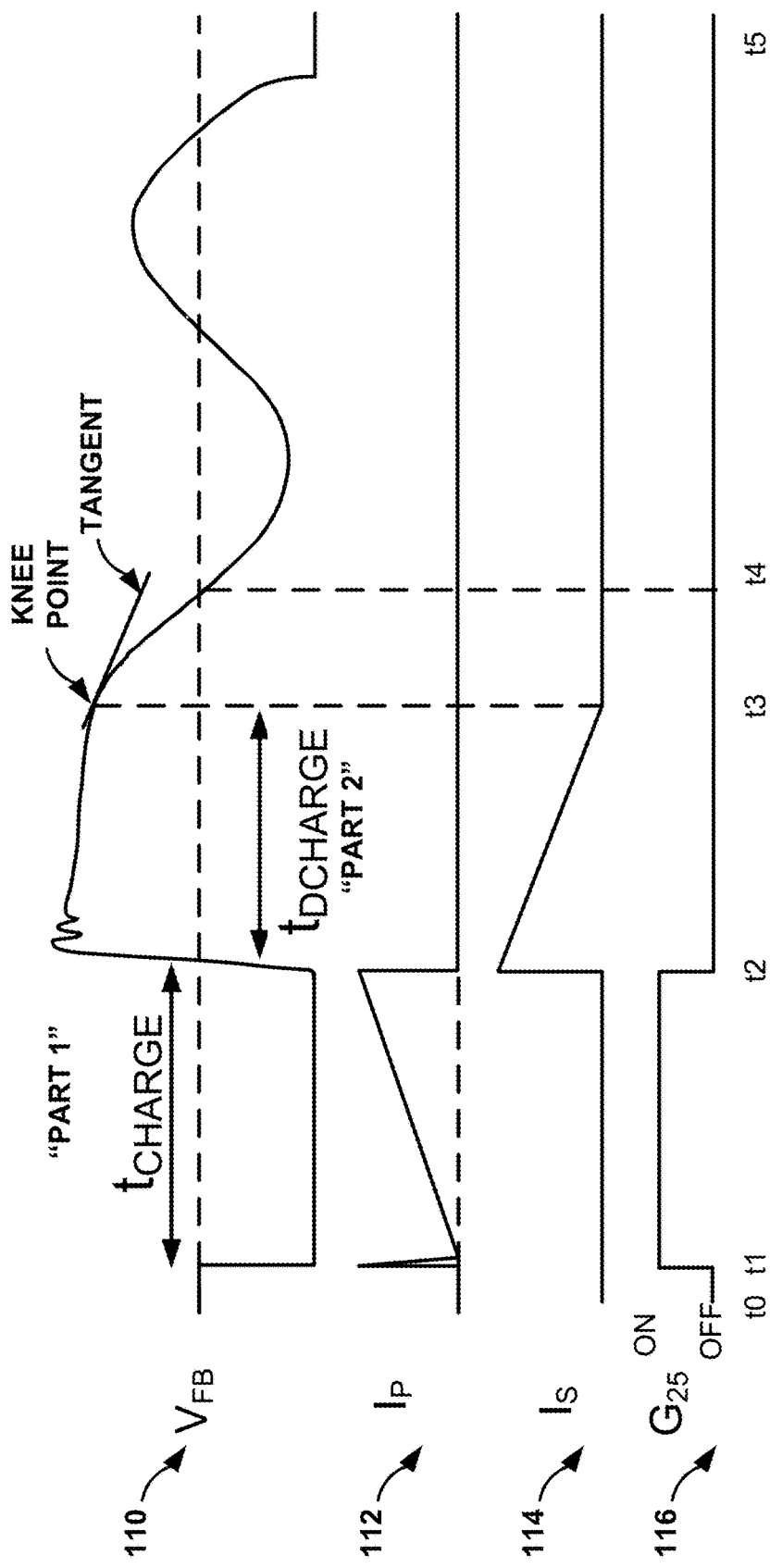
FIG. 7 is a timing diagram illustrating various electrical characteristics of the example power converter shown in FIG. 6, in accordance with one or more aspects of the present disclosure.

FIG. 7 is a timing diagram illustrating various electrical characteristics of the example power converter shown in FIG. 6, in accordance with one or more aspects of the present disclosure. FIG. 7 is described below in the context of converter 6B of FIG. 6. In particular, waveforms 110-116 of FIG. 7 represent some of the typical wave forms of a DCM flyback topology.

Waveform 110 corresponds to the resistor divided voltage $V_{FB}$ of auxiliary winding 24C between times t0 and t5. Waveforms 112 and 114 correspond, respectively, to the primary-side current $I_P$ running through primary-side winding 24A and the secondary-side current $I_S$ running through secondary-side winding 24B between times t0 and t5. And waveform 110 corresponds to the gate control signal $G_{25}$ applied to primary switching element 25 between times t0 and t5.

While operating power converter 6B in DCM, at time t1, controller 12B may generate a gate signal across link 16 that causes the MOSFET of primary switching element 25 to switch-on and as a result, causes a current $I_P$ to travel from source 2, via link 8, through primary winding 24A. When primary switching element 25 switched-on according to the gate control signal supplied by controller 12B, the current $I_P$ through primary-side winding 24A ramps up between times t1 and t2 (time $t_{CHARGE}$ or "$T_{ON}$") with a slope of $V_{IN}/Lp$. The energy stored in the core of transformer 23 at the end of $T_{ON}$ cycle at time t2 is proportional to $\frac{1}{2} \times L_P \times I_{PPEAK}^2$, where $L_P$ is the inductance of primary-side winding 24A and $I_{PPEAK}$ is the peak current of primary-side winding 24A. The current $I_S$ at secondary-side winding 24B is zero between times t1 and t2 during the $t_{CHARGE}$ or $T_{ON}$ phase. In addition, during the $t_{CHARGE}$ or $T_{ON}$ phase between times t1 and t2, the voltage $V_S$ across secondary-side winding 24B is negative (also referred to as the secondary-side ground) and equals $-N_S \times V_{IN}$, where $N_S$ is the transformer secondary/primary turn ratio.

At time t2, controller 12B may generate a different gate signal that causes primary switching element 25 to switch-off and, as a result, inhibits current $I_P$ from traveling from source 2, via link 8, through primary winding 24A. When primary switching element 25 switches off, the current $I_P$ becomes zero and the current $I_S$ through secondary-side winding 24B ramps down from the value $I_{SPEAK}$ (which is equal to $I_{PPEAK}/N_S$) to zero with a slope of approximately $-(V_{OUT}+V_{DOUT})/L_S$ (where $V_{OUT}$ is secondary-side output voltage across output capacitor 30 and $V_{DOUT}$ is the forward voltage drop across diode 41).

Between times t2 and t3, while the current $I_S$ at secondary-side winding 24B is still greater than zero and primary switching element 25 is switched-off, the output voltage $V_{OUT}$ is reflected according to the transformer turn ratio back to primary-side winding 24A. The output voltage $V_{OUT}$ is similarly reflected back to auxiliary winding 24C as the resistor divided voltage $V_{FB}$ of auxiliary winding 24C. Said differently, after primary switching element 25 is switched-off at time t2, the energy stored at transformer 23 during the magnetized period is delivered to secondary-side winding 24B (with a quantity of $N_S$ windings) and auxiliary winding 24C (with a quantity of $N_A$ windings) as shown in EQ. 6.

$$V_{AUX} = \frac{N_A}{N_S} \times (V_F + V_{OUT}) \quad \text{EQ. 6}$$

In EQ. 6, the voltage $V_F$ is the forward voltage of secondary element 41.

Voltage divider 42, which is formed resistors R2 and R3 across auxiliary winding 24C, outputs the resistor divided voltage $V_{FB}$ of auxiliary winding 24C to controller 12B. Controller 12B uses the resistor divided voltage $V_{FB}$ of auxiliary winding 24C for determining $V_{OUT}$, as shown below in EQ. 7.

$$V_{FB} = \frac{R_3}{R_2 + R_3} \times \frac{N_A}{N_S} \times (V_F + V_{OUT}) \quad \text{EQ. 7}$$

In order to more precisely detect the output voltage $V_{OUT}$ of power converter 6B, the resistor divided voltage $V_{FB}$ of auxiliary winding 24C should be measured at time t3, after the current $I_S$ at secondary-side winding 24B decreases to zero. Therefore, the variation of the forward voltage of secondary element 41 can be neglected. When the current $I_S$ at secondary-side winding 24B decreases to zero, the resistor divided voltage $V_{FB}$ of auxiliary winding 24C will be at "knee point" $V_{KNEE}$. Controller 12B may determine the resistor divided voltage $V_{FB}$ of auxiliary winding 24C based on EQ. 8:

$$V_{FB} = \frac{R_3}{R_2 + R_3} \times \frac{N_A}{N_S} \times V_{OUT} \quad \text{EQ. 8}$$

At time t3, when the voltage at auxiliary winding 24C will be at "knee point" $V_{KNEE}$ and the current $I_S$ at secondary-side winding 24B reaches zero, transformer windings 24A, 24B, and 24C become open and the resistor divided voltage $V_{FB}$ of auxiliary winding 24C converts to a damped ringing waveform fueled by residual energy in the $L_P$ and $C_d$ resonant circuit (where $C_d$ is the total equivalent capacitance at the drain of primary switching element 25). Accordingly, controller 12B may determine that when the resistor divided voltage $V_{FB}$ of auxiliary winding 24C reflects the "knee point" voltage $V_{KNEE}$, such as at time t3, that the duration $t_{DCHARGE}$ has ended and that $V_{OUT}$ may be too low for load 4 and that controller 12B should switch primary switching element 25 back on in order to re-charge transformer 23. Controller 12B may vary the duty cycle of primary switching element 25 in response to detecting the "knee point" voltage $V_{KNEE}$ associated with the resistor divided voltage $V_{FB}$ of auxiliary winding 24C in order to keep the output voltage $V_{OUT}$ constant over changing load and changing input voltage $V_{IN}$ conditions.

Figure 8:
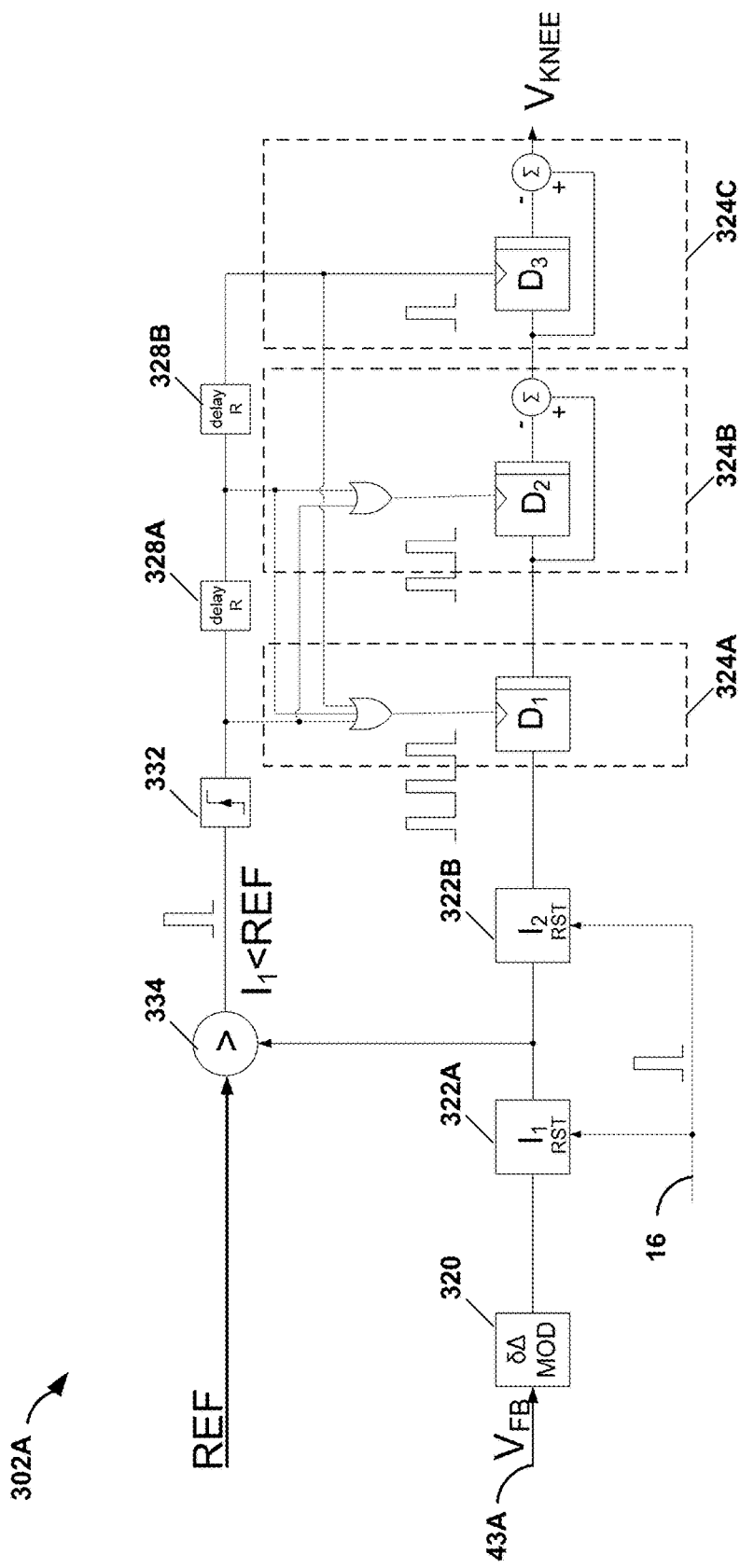
FIG. 8 is a conceptual diagram illustrating an example knee point voltage detector unit of the example control unit of the example power converter of FIG. 6.

FIG. 8 is a conceptual diagram illustrating knee point voltage detector unit 302A as one example knee point voltage detector unit of control unit 12B of power converter 6B of FIG. 6. Knee point voltage detector unit 302A of FIG. 8 is described below in the context of FIGS. 1, 6, and 7.

Knee point voltage detector unit 302A includes delta-sigma converter 320, integrators 322A and 322B, differential blocks 324A-324C, delay buffers 328A and 328B, digital rising edge detector 332, and comparator 334. REF signal represents a digital reference signal or threshold that is close to or at zero level.

Knee point voltage detector unit 302A receives the resistor divided voltage $V_{FB}$ of auxiliary winding 24C and gate control signal associated with primary switching element 25 as inputs and in response outputs a voltage level indicative of the knee point voltage $V_{KNEE}$. The knee point voltage $V_{KNEE}$ is one measurement or indication of the output voltage $V_{OUT}$. Controller 12B may compare the knee point voltage $V_{KNEE}$ with a reference or threshold voltage that follows a PID filter to determine when, and for how long, to switch-on primary switching element 25. For example, controller 12B may determine, based on the knee point voltage $V_{KNEE}$ output from knee point voltage detector unit 302A, that transformer 23 needs an additional charge and in response, cause the gate control signal at link 16 to switch-on primary switching element 25. Conversely, controller 12B may determine, based on the knee point voltage $V_{KNEE}$ output from knee point voltage detector unit 302A, that transformer 23 does not need an additional charge and in response may cause the gate control signal at link 16 to maintain primary switching element 25 in a switched-off state.

The principles of knee point voltage detector unit 302A are based on the derivations described above with respect to EQS. 1-8 and the following.

$$\frac{V_{IN} \times T_{ON} \times N_{AUX}}{N_P} = \frac{(V_{OUT} + V_f) \times N_{AUX}}{N_S} \times T_{DCHARGE} \quad \text{EQ. 9}$$

In EQ. 9, $V_f$ is the forward voltage of secondary element 41. The left side term of EQ. 9 represents the area of "part 1" associated with waveform 110 (i.e., the resistor divided voltage $V_{FB}$ of auxiliary winding 24C) shown in FIG. 7 and the right side term of EQ. 9 is the area of "part 2" in FIG. 7.

Rather than perform the slower and sometimes less accurate task of comparing the analog signal associated with the resistor divided voltage $V_{FB}$ of auxiliary winding 24C to one or more thresholds to determine whether the resistor divided voltage $V_{FB}$ of auxiliary winding 24C may or may not be at the "knee point", knee point voltage detector unit 302A determines a binary digital signal indicative of whether the resistor divided voltage $V_{FB}$ of auxiliary winding 24C is or is not at knee point voltage $V_{KNEE}$ using delta-sigma modulation techniques performed by delta-sigma converter 320 to integrate the analog signal associated with the resistor divided voltage $V_{FB}$ of auxiliary winding 24C across both "part 1" and "part 2".

Each time prior to causing primary switching element 25 to switch-on, knee point voltage detection unit 302A may reset delta-sigma converter 320. After causing primary switching element 25 to switch-on, delta-sigma converter 320 starts integrating the resistor divided voltage $V_{FB}$ of auxiliary winding 24C. When controller unit 12B causes primary switching element 25 to switch-off, delta-sigma converter 320 will have reached its highest integration peak and then decrease until delta-sigma converter 320 reaches a zero integration level. The time for delta-sigma converter 320 to reach zero integration level after reaching the integration peak equals time $t_{DCHARGE}$.

With regards to the example of FIG. 8, to determine when the resistor divided voltage $V_{FB}$ of auxiliary winding 24C is at knee point, delta-sigma converter 320 receives the analog signal indicative of the resistor divided voltage $V_{FB}$ of auxiliary winding 24C and using delta-sigma conversion techniques, outputs the integral of the resistor divided voltage $V_{FB}$ of auxiliary winding 24C as a one-bit digital data stream to integrator 322A. In some examples, delta-sigma converter 320 is a second order delta-sigma converter. In other examples, delta-sigma converter 320 is an nth order delta-sigma converter.

Each of integrators 322A and 322B is reset by the rising edge of the gate control signal that controller 12B outputs at link 16 to drive primary element 25 switched-on or switched-off. The output of integrator 322A is received by integrator 322B and the output of integrator 322B is received by differential block 324A.

Comparator 334 is used to search when the resistor divided voltage $V_{FB}$ of auxiliary winding 24C is at knee point $V_{KNEE}$. In the example of FIG. 8, if within three pulses of an internal clock of knee point detection unit 302A, the integral of the resistor divided voltage $V_{FB}$ of auxiliary winding 24C is all lower than REF, then knee point detection unit 302A will output an indication that the resistor divided voltage $V_{FB}$ of auxiliary winding 24C is at the knee point. Otherwise, knee point detection unit 302A will output a digital signal that represents the knee point voltage $V_{KNEE}$ as one measurement of the output voltage $V_{OUT}$.

Figure 9:
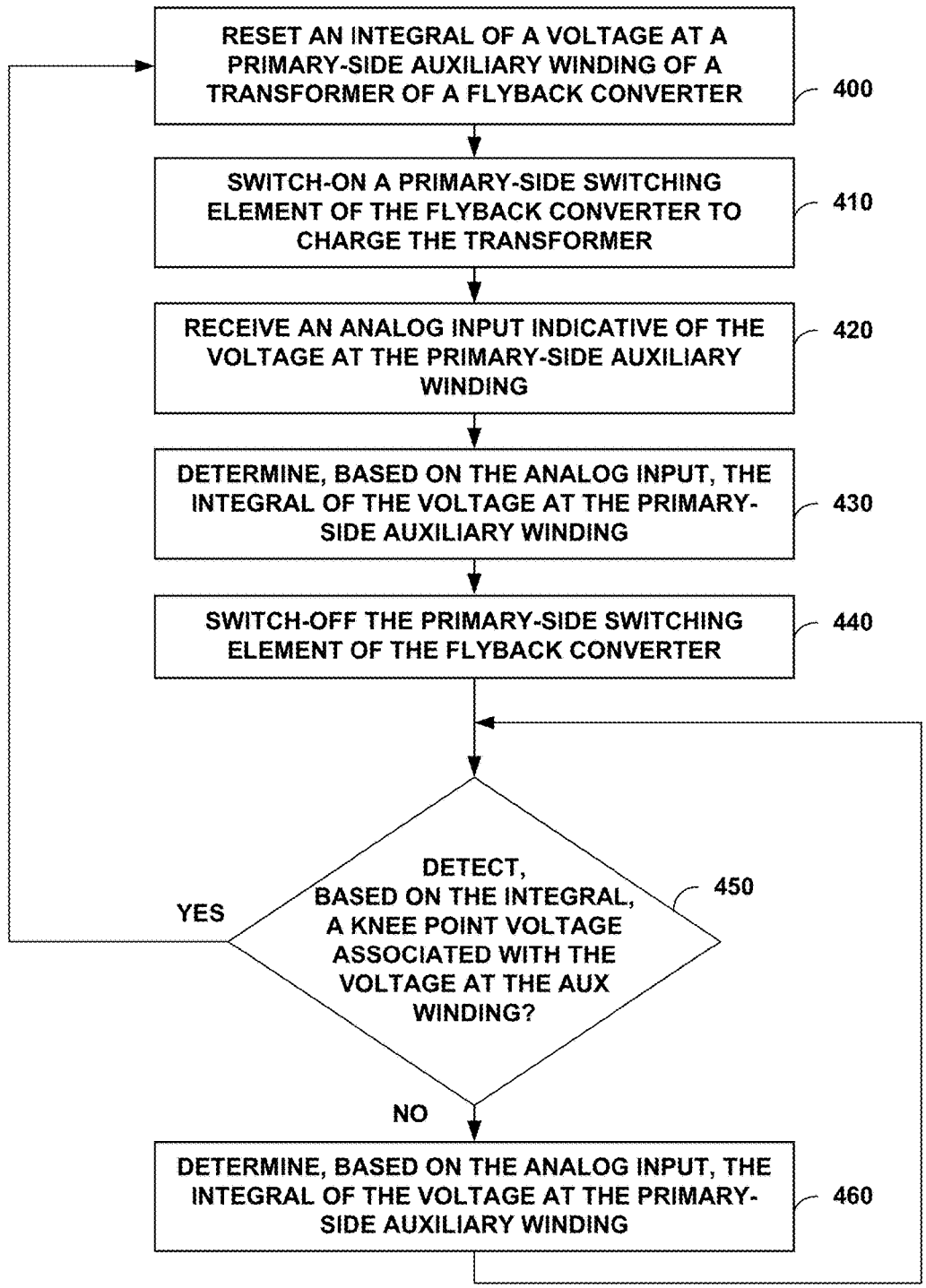
FIG. 9 is a flowchart illustrating example operations of the example control unit of FIG. 6, using the example knee point voltage detector unit of FIG. 8, in accordance with techniques of this disclosure.

FIG. 9 is a flowchart illustrating example operations 400-460 performed by controller 12B of FIG. 6 using knee point voltage detector unit 302A of FIG. 8, in accordance with techniques of this disclosure. FIG. 9 is described below in the context of FIGS. 1, 6, 7, and 8.

In operation, controller 12B may switch-on primary switching element 25 to charge transformer 23 (410). Prior to switching-on primary switching element 25 however, controller 12B may reset an integral of the voltage at auxiliary winding 24C (400). In other words, controller 12B may cause knee point voltage detector unit 302A to reset the integral associated with the resistor divided voltage $V_{FB}$ of auxiliary winding 24C just prior to switching-on primary switching element 25 to charge transformer 23.

After initially switching-on primary switching element 25 to charge transformer 23, controller 12B may receive an analog input indicative of the resistor divided voltage $V_{FB}$ of auxiliary winding 24C at auxiliary winding 24C (420). Controller 12B may determine, based on the analog input, an integral of the resistor divided voltage $V_{FB}$ of auxiliary winding 24C at auxiliary winding 24C (430). For example, controller 12B may pass the analog input received via link 43A to knee point detection unit 302A for integration by delta-sigma converter 320. Delta-sigma converter 320 may convert the analog input into a digital bit stream indicative of the integral of the analog input.

After charging transformer 23, controller 12B may switch-off primary switching element 25 (440). And after switching-off primary switching element 25, controller 12B may detect, based on the integral, a knee point voltage associated with the voltage at the primary-side auxiliary winding (450). For example, knee point voltage detection unit 302A may detect the knee point voltage associated with the resistor divided voltage $V_{FB}$ of auxiliary winding 24C at auxiliary winding 24C in response to detecting the knee point voltage during at least three successive clock pulses of an internal clock of the primary-side controller. If knee point voltage detection unit 302A does not detect the knee point voltage, controller 12B may poll and continue to determine the integral of the resistor divided voltage $V_{FB}$ of auxiliary winding 24C at auxiliary winding 24C (460). Otherwise, responsive to detecting the knee point voltage, controller 12B may again reset the integral (400) and subsequently switch-on primary switching element 25 to again charge transformer 23 (410).

Figure 10:
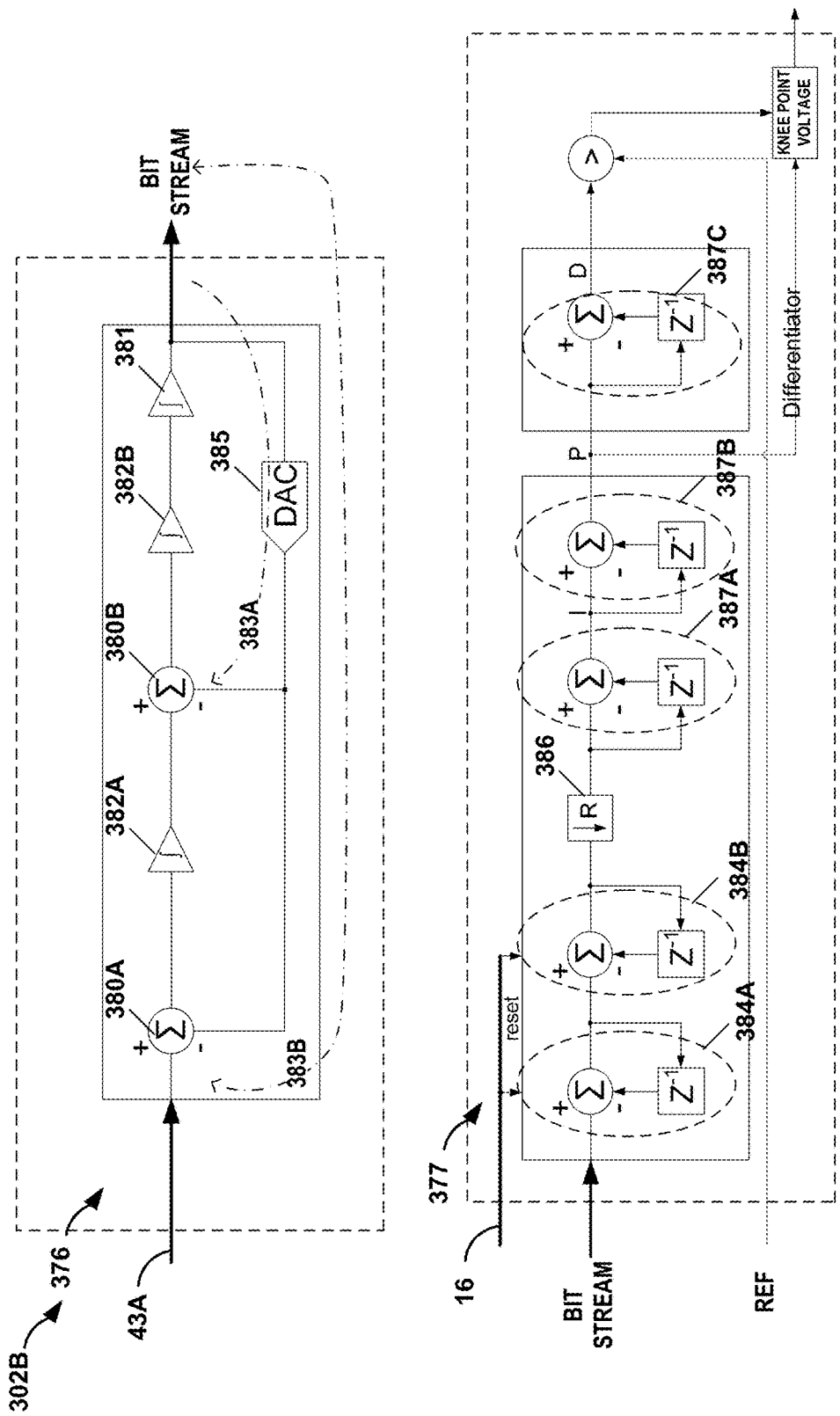
FIG. 10 is a conceptual diagram illustrating an additional example knee point voltage detector unit of the example control unit of the example power converter of FIG. 6.

FIG. 10 is a conceptual diagram illustrating knee point voltage detector unit 302B as one additional example knee point voltage detector unit of control unit 12B of power converter 6B of FIG. 6. Knee point voltage detector unit 302B of FIG. 10 is described below in the context of FIGS. 1, 6, and 7.

Referring back to FIG. 7, with reference to waveform 110 which represents the resistor divided voltage $V_{FB}$ of auxiliary winding 24C between times t0 and t5, the rate of change of the resistor divided voltage $V_{FB}$ of auxiliary winding 24C changes rapidly at time t3 when the resistor divided voltage $V_{FB}$ of auxiliary winding 24C is at the knee point. Accordingly, at time t3, the knee point of the resistor divided voltage $V_{FB}$ of auxiliary winding 24C can be detected in response to detecting a sudden high rate of change to the rate of change of the resistor divided voltage $V_{FB}$ of auxiliary winding 24C. In addition, since at time t3, the secondary side current $I_S$ reaches zero, the forward voltage $V_f$ across secondary element 41 is zero volts and the output voltage $V_{OUT}$ can easily be derived simply by sampling the resistor divided voltage $V_{FB}$ of auxiliary winding 24C, once, at time t3 and computing $V_{OUT}$ based on EQ. 8 (see above with respect to FIG. 7).

Knee point detection unit 302B uses the above principles to identify a sudden slope rate of the resistor divided voltage $V_{FB}$ of auxiliary winding 24C suddenly changing during $t_{DCHARGE}$, and in response to identifying such a sudden slope rate change, immediately sample and hold the resistor divided voltage $V_{FB}$ of auxiliary winding 24C as the knee point, and use this held resistor divided voltage $V_{FB}$ of auxiliary winding 24C to regulate $V_{OUT}$.

Knee point detection unit 302B includes delta-sigma converter 376 and CIC filter 377. Delta-sigma converter 376 receives the analog signal indicative of the resistor divided voltage $V_{FB}$ of auxiliary winding 24C as its input and outputs a digital, one-bit data stream indicative of the integral of the resistor divided voltage $V_{FB}$ of auxiliary winding 24C. In the example of FIG. 10, delta-sigma converter 376 is a second-order delta-sigma converter. In other examples, delta-sigma converter 376 may be an $n^{th}$ order delta-sigma converter. Delta-sigma converter 376 receives the analog signal indicative of the resistor divided voltage $V_{FB}$ of auxiliary winding 24C as its input and through second-order delta-sigma conversion techniques, produces a high-frequency one-bit data stream output. Delta-sigma converter 376 includes a group of adders 380A and 380B interspersed with, and connected in series with, a group of integrators 382A and 382B and coupled to the input of a one-bit ADC (e.g., comparator) 381. Delta-sigma converter 376 also include DAC 385 which forms feedback loops 383A and 383B that couple the output of delta-sigma converter 376 (i.e., the output of ADC 381) to, respectively, a respective input of adders 380A and 380B.

In the example of FIG. 10, CIC filter 377 is a second-order CIC filter. In other examples, CIC filter 377 may be an $n^{th}$ order CIC filter. CIC filter 377 includes a cascade of digital integrators 384A and 384B followed by a cascade of combs 387A and 387B (i.e., digital differentiators) in equal quantity to the quantity of digital integrators 384A and 384B. Between digital integrators 384A and 84B and digital differentiators 387A and 87B is digital switch or decimator 386 (e.g., used to lower the sampling frequency of the combs signal with respect to the sampling frequency of the integrators). An additional differentiator 387C follows the cascade of combs 387A and 387B.

CIC filter 377 receives the one-bit digital stream from delta-sigma converter 376 and outputs P and D terms that are used by knee point voltage detection unit 302B to determine and/or hold the knee point voltage value. CIC filter 377 receives as additional input, the gate control signal at link 16 which CIC filter 377 uses to reset the digital integrators 384A and 384B at the falling edge or switching-off of primary switching element 25. In addition, CIC filter 377 receives as additional input, a reference signal REF (e.g., REF signal represents a digital reference signal or threshold that represents a zero value) that CIC filter 377 uses to compare with the D term to discern whether or not the resistor divided voltage $V_{FB}$ of auxiliary winding 24C is at knee point. If the output from differentiator 387C exceeds REF, indicating that the slope of the rate of change of the one-bit data stream from delta-sigma converter 376 has changed suddenly, then knee point detection unit 302B holds the knee point voltage for regulating $V_{OUT}$.

Figure 11:
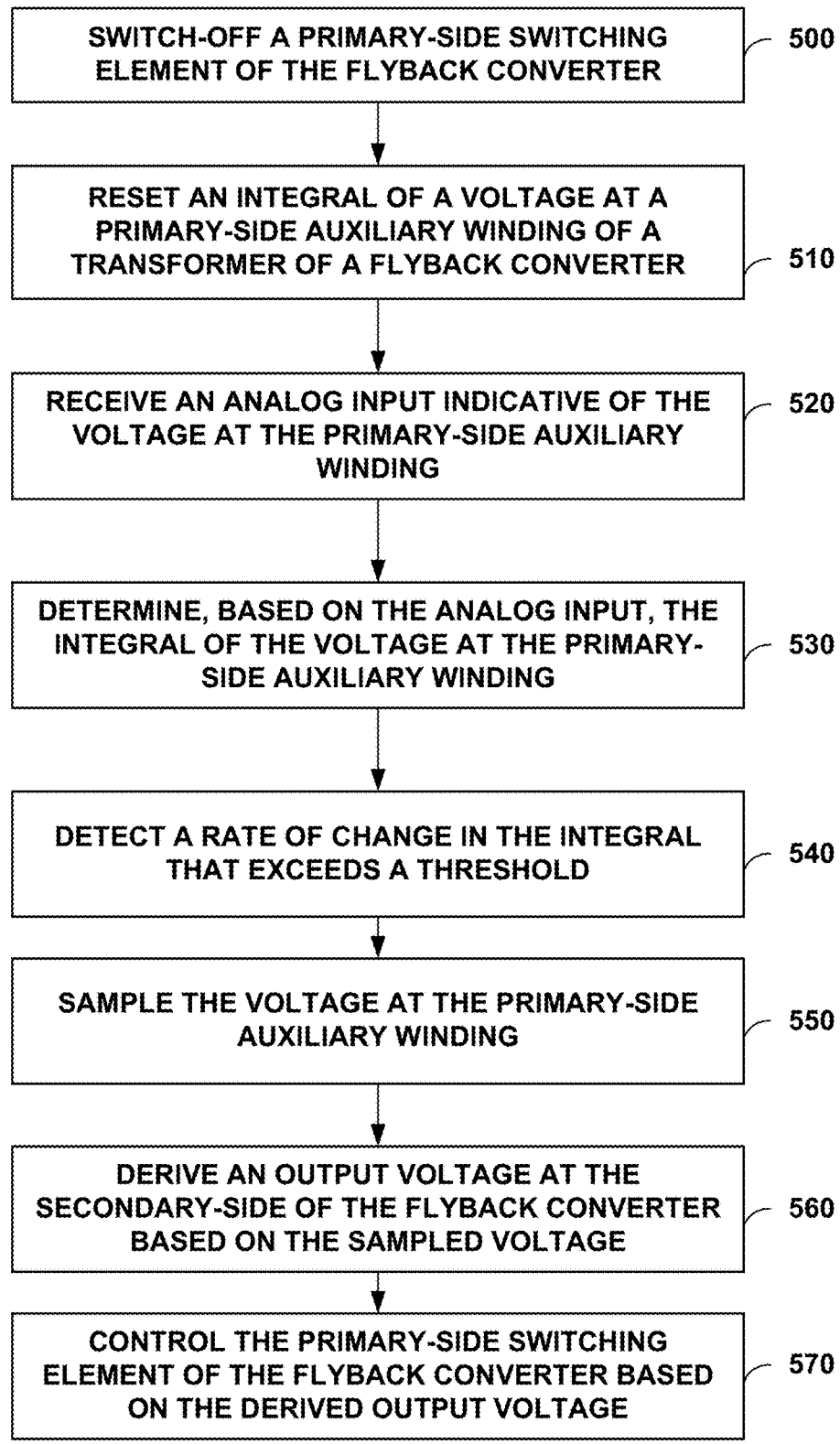
FIG. 11 is a flowchart illustrating example operations of the example control unit of FIG. 6, using the example knee point voltage detector unit of FIG. 10, in accordance with techniques of this disclosure.

FIG. 11 is a flowchart illustrating example operations of control unit 6B of FIG. 6, using knee point voltage detector unit 302B of FIG. 10, in accordance with techniques of this disclosure. FIG. 9 is described below in the context of FIGS. 1, 6, 7, and 10.

In operation, controller 12B may switch-off primary switching element 25 after charging transformer 23 (500). After switching-off primary switching element 25, controller 12B may reset knee point voltage detection unit 302B such that any previously captured integral is reset to zero (510).

During time $t_{DCHARGE}$, as transformer 23 discharges while primary switching element 25 remains switched off, controller 12B may receive an analog input indicative of the resistor divided voltage $V_{FB}$ of auxiliary winding 24C at auxiliary winding 24C (520). Controller 12B may determine, based on the analog input, an integral of the resistor divided voltage $V_{FB}$ of auxiliary winding 24C at auxiliary winding 24C (530). For example, controller 12B may pass the analog input received via link 43A to knee point detection unit 302B for integration by delta-sigma converter 320. Delta-sigma converter 376 may convert the analog input into a digital bit stream indicative of the integral of the analog input.

Controller 12B may detect a rate of change in the integral that exceeds a threshold (540). For example, CIC filter 377 may determine that the D term associated with the one-bit digital data stream received from delta-sigma converter 376 exceeds the REF value of zero. Controller 12B may detect, based on the integral, a knee point voltage associated with the voltage at the primary-side auxiliary winding (540) in response to detecting the rate of change in the integral.

Controller 12B may equate the knee point voltage detected by CIC 377 if knee point detection unit 302B as an indication of the output voltage at the secondary-side of converter 6B. Controller 12B may sample the voltage at the primary-side auxiliary winding of the transformer (550) in response to detecting the rate of change that exceeds the threshold. For example, controller 12B may record the knee point voltage being held by knee point voltage detection unit 302B for use in deriving the output voltage $V_{OUT}$.

Controller 12B may derive, based on the sampled voltage, an output voltage at a secondary-side of the flyback converter (560). For example, by sampling the knee point voltage precisely when $I_S$ reaches zero at the end of $t_{DCHARGE}$, controller 12B can use EQ. 8 to determine $V_{OUT}$.

Controller 12B may control, based on the output voltage $V_{OUT}$ derived from the sampled voltage, primary switching element 25 (570). For example, controller 12B may switch-on and switch-off primary switching element 25 to charge and discharge transformer 23 accordingly to maintain $V_{OUT}$ at a constant (required) voltage for load 4.

Clause 1. A method comprising: receiving, by an integrated circuit, one or more analog inputs indicative of a secondary-side voltage across a secondary-side winding of a transformer of a flyback power converter; converting, by a delta-sigma converter of the integrated circuit, the one or more analog inputs into a digital bit stream indicative of the secondary-side voltage; determining, by a cascaded integrator-comb filter of the integrated circuit, a proportional factor associated with the digital bit stream, an integral factor associated with the digital bit stream, and a derivative factor associated with the digital bit stream; and controlling, by the integrated circuit, a synchronous rectification switching element coupled to the secondary-side winding of the flyback power converter based on the proportional factor, the integral factor, and the derivative factor.

Clause 2. The method of clause 1, wherein controlling the synchronous rectification switching element comprises: responsive to determining that the proportional factor exceeds a first threshold or the derivative factor exceeds a second threshold, driving, by the integrated circuit, the synchronous rectification switching element in a switched-off state.

Clause 3. The method of any of clauses 1-2, wherein controlling the synchronous rectification switching element comprises: responsive to determining that the proportional factor does not exceed a first threshold or the derivative factor does not exceed a second threshold, driving, by the integrated circuit, the synchronous rectification switching element in a switched-on state.

Clause 4. The method of clause 3, further comprising: after driving the synchronous rectification switching element in the switched-on state and responsive to determining that the integral factor exceeds a minimum threshold, driving, by the integrated circuit, the synchronous rectification switching element in a switched-off state.

Clause 5. The method of any of clauses 1-4, wherein: the one or more analog inputs indicative of the secondary-side voltage are further indicative of a drain voltage of a transistor of the synchronous rectification switching element and an output voltage of the flyback converter; and converting the one or more analog inputs into the digital bit stream indicative of the secondary-side voltage comprises: determining, by the delta-sigma converter, a differential voltage level between the drain voltage and the output voltage; and converting, by the delta-sigma converter, the differential voltage into the digital bit stream indicative of the secondary-side voltage.

Clause 6. The method of any of clauses 1-5, wherein the delta-sigma converter is a n-order delta-sigma converter, where n is an integer greater than or equal to one.

Clause 7. The method of clause 6, wherein the delta-sigma converter is a second order delta-sigma converter.

Clause 8. A flyback converter comprising: a transformer having a primary-side winding and a secondary-side winding; a primary switching element configured to couple and de-couple the primary-side winding to and from a voltage source; a secondary switching element coupled to the secondary side winding and configured to perform synchronous rectification when the primary-side winding is de-coupled from the voltage source; and an integrated circuit for controlling the secondary switching element to perform synchronous rectification, wherein the integrated circuit includes: a delta-sigma modulator configured to receive one or more analog inputs indicative of a secondary-side voltage across the secondary-side winding and convert the one or more analog inputs into a digital bit stream indicative of the secondary-side voltage; and a filter configured to determine: a proportional factor associated with the digital bit stream, an integral factor associated with the digital bit stream, and a derivative factor associated with the digital bit stream, wherein the integrated circuit is configured to control the secondary switching element based on the proportional factor, the integral factor, and the derivative factor.

Clause 9. The flyback converter of clause 8, wherein the integrated circuit is further configured to control the secondary switching element by at least driving the secondary switching element in a switched-off state in response to determining that the proportional factor exceeds a first threshold or the derivative factor exceeds a second threshold.

Clause 10. The flyback converter of any of clauses 8-9, wherein the integrated circuit is further configured to control the secondary switching element by at least driving the secondary switching element in a switched-on state in response to determining that the proportional factor does not exceed a first threshold or the derivative factor does not exceed a second threshold.

Clause 11. The flyback converter of clause 10, wherein the integrated circuit is further configured to control the secondary switching element by at least driving the secondary switching element in a switched-off state after driving the synchronous rectification switching element in the switched-on state and in response to determining that the integral factor is approaching and exceeds a minimum threshold.

Clause 12. The flyback converter of any of clauses 8-11, further comprising an output capacitor, wherein: the one or more analog inputs indicative of the secondary-side voltage include a first analog input indicative of a drain voltage of a transistor of the secondary switching element and a second analog input indicative of an output voltage across the output capacitor; and the delta-sigma modulator is further configured to convert the one or more analog inputs into the digital bit stream indicative of the secondary-side voltage by at least: determining a differential voltage level between the drain voltage and the output voltage; and converting the differential voltage into the digital bit stream indicative of the secondary-side voltage.

Clause 13. The flyback converter of any of clauses 8-12, wherein the delta-sigma modulator is a second order delta-sigma modulator.

Clause 14. The flyback converter of any of clauses 8-13, wherein the delta-sigma modulator is an nth order delta-sigma modulator, wherein n is an integer greater than or equal to one.

Clause 15. The flyback converter of any of clauses 8-14, wherein the delta-sigma modulator includes an integrator stage coupled to a comb stage, and the comb stage is coupled to a single differentiator, wherein: the integral factor corresponds to an output of a first differentiator of the comb stage and an input of a second differentiator of the comb stage; the proportional factor corresponds to a output of the comb stage and an input of the single differentiator; and the derivative factor corresponds to an output of the single differentiator.

Clause 16. A method comprising: after initially switching-on a primary switching element of a flyback converter to charge a transformer, receiving, by primary-side controller of the flyback converter, an analog input indicative of a voltage at a primary-side auxiliary winding of the transformer; determining, by primary-side controller, based on the analog input, an integral of the voltage at the primary-side auxiliary winding; after switching-off the primary switching element, detecting, by the primary-side controller, based on the integral, a knee point voltage associated with the voltage at the primary-side auxiliary winding; and responsive to detecting the knee point voltage, subsequently switching-on, by the primary-side controller, the primary switching element to charge the transformer.

Clause 17. The method of clause 16, wherein the knee point voltage associated with the voltage at the primary-side auxiliary winding is detected in response to detecting the knee point voltage during at least three successive clock pulses of an internal clock of the primary-side controller.

Clause 18. The method of any of clauses 16-17, wherein determining the integral comprises prior to initially switching-on the primary switching element, resetting, by the primary-side controller, the integral to zero.

Clause 19. The method of clauses 16-18, wherein determining the integral comprises converting, by a delta-sigma converter of the primary-side controller, the analog input into a digital bit stream indicative of the integral of the analog input.

Clause 2. The method of clause 19, wherein the knee point voltage associated with the voltage at the primary-side auxiliary winding is detected in response to detecting a rate of change in the digital bit stream that exceeds a threshold.

Clause 21. The method of clause 20, further comprising: sampling, by the primary-side controller, the voltage at the primary-side auxiliary winding of the transformer in response to detecting the rate of change in the digital bit stream that exceeds the threshold; and deriving, by the primary-side controller, based on the sampled voltage, an output voltage at a secondary-side of the flyback converter.

Clause 22. The method of clause 21, further comprising: controlling, by the primary-side controller, based on the output voltage derived from the sampled voltage, the primary switching element.

Clause 23. A flyback converter comprising: a transformer having a primary-side winding, a primary-side auxiliary winding, and a secondary-side winding; a configured to couple and de-couple the primary-side winding to and from a voltage source; a knee point voltage detection unit configured to: determine, based on an analog input indicative of a voltage at the primary-side auxiliary winding, an integral of the voltage at the primary-side auxiliary winding; and detect, based on the integral, a knee point voltage associated with the voltage at the primary-side auxiliary winding; and a controller configured to: after initially switching-on the primary switching element to couple the primary-side winding to the voltage source to charge the transformer, switching-off the primary switching element; and responsive to the knee point voltage detection unit detecting the knee point voltage associated with the voltage at the primary-side auxiliary winding, subsequently switch-on the primary switching element to couple the primary-side winding to the voltage source to charge the transformer.

Clause 24. The flyback converter of clause 23, wherein the knee point voltage detection unit comprises a clock and the knee point voltage detection unit is further configured to detect the knee point voltage associated with the voltage at the primary-side auxiliary winding in response to detecting the knee point voltage during at least three successive clock pulses of the clock.

Clause 25. The flyback converter of any of clauses 23-24, wherein the knee point voltage detection unit is further configured to determine the integral of the voltage at the primary-side auxiliary winding by at least resetting the integral to zero prior to the controller initially switching-on the primary switching element.

Clause 26. The flyback converter of any of clauses 23-25, wherein the knee point voltage detection unit comprises a delta-sigma converter configured to determine the integral of the voltage at the primary-side auxiliary winding by at least converting the analog input into a digital bit stream indicative of the integral of the analog input.

Clause 27. The flyback converter of clause 26, wherein the delta-sigma converter is a second-order delta-sigma converter.

Clause 28. The flyback converter of any of clauses 26-27, wherein knee point voltage detection unit is further configured to detect the knee point voltage associated with the voltage at the primary-side auxiliary winding in response to detecting a rate of change in the digital bit stream that exceeds a threshold.

Clause 29. The flyback converter of clause 28, wherein the controller is further configured to: sample the voltage at the primary-side auxiliary winding of the transformer in response to the knee point voltage detection unit detecting the rate of change in the digital bit stream that exceeds the threshold; and derive, based on the sampled voltage, an output voltage at a secondary-side of the flyback converter.

Clause 30. The flyback converter of clause 29, wherein the controller is further configured to: control, based on the output voltage derived from the sampled voltage, the primary switching element.

Clause 31. A system comprising means for performing any of the methods of clauses 1-7.

Clause 32. A non-transitory computer-readable storage medium comprising instructions that, when executed by at least one processor, cause the processor to perform any of the methods of clauses 1-7.

Clause 33. A system comprising means for performing any of the methods of clauses 16-22.

Clause 34. A non-transitory computer-readable storage medium comprising instructions that, when executed by at least one processor, cause the processor to perform any of the methods of clauses 16-22.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. Many of the described examples concern techniques for communicating between the secondary and primary-side of a flyback converter so as to enable the use of a common controller for both sides of the flyback converter. However, the described techniques for communicating between two sides of a transformer may also be used for other reasons, or in other transformer applications. These and other examples are within the scope of the following claims.

What is claimed is:

1. A method comprising:
receiving, by an integrated circuit, one or more analog inputs indicative of a secondary-side voltage across a secondary-side winding of a transformer of a flyback power converter;
converting, by a delta-sigma converter of the integrated circuit, the one or more analog inputs into a digital bit stream indicative of the secondary-side voltage;
determining, by a cascaded integrator-comb filter of the integrated circuit, a proportional factor associated with the digital bit stream, an integral factor associated with the digital bit stream, and a derivative factor associated with the digital bit stream; and
controlling, by the integrated circuit, a synchronous rectification switching element coupled to the secondary-side winding of the flyback power converter based on the proportional factor, the integral factor, and the derivative factor.

2. The method of claim 1, wherein controlling the synchronous rectification switching element comprises:
responsive to determining that the proportional factor exceeds a first threshold or the derivative factor exceeds a second threshold, driving, by the integrated circuit, the synchronous rectification switching element in a switched-off state.

3. The method of claim 1, wherein controlling the synchronous rectification switching element comprises:
responsive to determining that the proportional factor does not exceed a first threshold or the derivative factor does not exceed a second threshold, driving, by the integrated circuit, the synchronous rectification switching element in a switched-on state.

4. The method of claim 3, further comprising:
after driving the synchronous rectification switching element in the switched-on state and responsive to determining that the integral factor exceeds a minimum threshold, driving, by the integrated circuit, the synchronous rectification switching element in a switched-off state.

5. The method of claim 1, wherein:
the one or more analog inputs indicative of the secondary-side voltage are further indicative of a drain voltage of a transistor of the synchronous rectification switching element and an output voltage of the flyback converter; and
converting the one or more analog inputs into the digital bit stream indicative of the secondary-side voltage comprises:
determining, by the delta-sigma converter, a differential voltage level between the drain voltage and the output voltage; and
converting, by the delta-sigma converter, the differential voltage into the digital bit stream indicative of the secondary-side voltage.

6. The method of claim 1, wherein the delta-sigma converter is a n-order delta-sigma converter, where n is an integer greater than or equal to one.

7. The method of claim 6, wherein the delta-sigma converter is a second order delta-sigma converter.

8. A flyback converter comprising:
a transformer having a primary-side winding and a secondary-side winding;
a primary switching element configured to couple and de-couple the primary-side winding to and from a voltage source;
a secondary switching element coupled to the secondary side winding and configured to perform synchronous rectification when the primary-side winding is de-coupled from the voltage source; and
an integrated circuit for controlling the secondary switching element to perform synchronous rectification, wherein the integrated circuit includes:
a delta-sigma modulator configured to receive one or more analog inputs indicative of a secondary-side voltage across the secondary-side winding and convert the one or more analog inputs into a digital bit stream indicative of the secondary-side voltage; and
a filter configured to determine: a proportional factor associated with the digital bit stream, an integral factor associated with the digital bit stream, and a derivative factor associated with the digital bit stream,
wherein the integrated circuit is configured to control the secondary switching element based on the proportional factor, the integral factor, and the derivative factor.

9. The flyback converter of claim 8, wherein the integrated circuit is further configured to control the secondary switching element by at least driving the secondary switching element in a switched-off state in response to determining that the proportional factor exceeds a first threshold or the derivative factor exceeds a second threshold.

10. The flyback converter of claim 8, wherein the integrated circuit is further configured to control the secondary switching element by at least driving the secondary switching element in a switched-on state in response to determining that the proportional factor does not exceed a first threshold or the derivative factor does not exceed a second threshold.

11. The flyback converter of claim 10, wherein the integrated circuit is further configured to control the secondary switching element by at least driving the secondary switching element in a switched-off state after driving the synchronous rectification switching element in the switched-on state and in response to determining that the integral factor is approaching and exceeds a minimum threshold.

12. The flyback converter of claim 8, further comprising an output capacitor, wherein:
the one or more analog inputs indicative of the secondary-side voltage include a first analog input indicative of a drain voltage of a transistor of the secondary switching element and a second analog input indicative of an output voltage across the output capacitor; and
the delta-sigma modulator is further configured to convert the one or more analog inputs into the digital bit stream indicative of the secondary-side voltage by at least:
determining a differential voltage level between the drain voltage and the output voltage; and
converting the differential voltage into the digital bit stream indicative of the secondary-side voltage.

13. The flyback converter of claim 8, wherein the delta-sigma modulator is a second order delta-sigma modulator.

14. The flyback converter of claim 8, wherein the delta-sigma modulator is an nth order delta-sigma modulator, wherein n is an integer greater than or equal to one.

15. The flyback converter of claim 8, wherein the delta-sigma modulator includes an integrator stage coupled to a comb stage, and the comb stage is coupled to a single differentiator, wherein:
the integral factor corresponds to an output of a first differentiator of the comb stage and an input of a second differentiator of the comb stage;
the proportional factor corresponds to a output of the comb stage and an input of the single differentiator; and
the derivative factor corresponds to an output of the single differentiator.

* * * * *